US012288255B2

(12) United States Patent
Mayuzumi

(10) Patent No.: US 12,288,255 B2
(45) Date of Patent: Apr. 29, 2025

(54) INTERMEDIARY SERVER, SYSTEM, INTERMEDIATING METHOD, AND NON-TRANSITORY RECORDING MEDIUM

(71) Applicant: Ryusuke Mayuzumi, Kanagawa (JP)

(72) Inventor: Ryusuke Mayuzumi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 8 days.

(21) Appl. No.: 17/945,145

(22) Filed: Sep. 15, 2022

(65) Prior Publication Data

US 2023/0020412 A1  Jan. 19, 2023

Related U.S. Application Data

(63) Continuation of application No. PCT/JP2021/008719, filed on Mar. 5, 2021.

(30) Foreign Application Priority Data

Mar. 19, 2020 (JP) .................................. 2020-050115
May 21, 2020 (JP) .................................. 2020-088924
Feb. 5, 2021 (JP) .................................. 2021-017719

(51) Int. Cl.
  *G06Q 40/00* (2023.01)
  *G06Q 40/04* (2012.01)
  (Continued)

(52) U.S. Cl.
  CPC .............. *G06Q 40/04* (2013.01); *H04L 9/50* (2022.05); *G06Q 50/06* (2013.01)

(58) Field of Classification Search
  CPC .... G06Q 40/04; G06Q 50/06; G06Q 30/0605; G06Q 30/06; H04L 9/50; H04L 2209/56;
  (Continued)

(56) References Cited

U.S. PATENT DOCUMENTS 7,373,320 B1 * 5/2008 McDonough .......... G06Q 40/03
                                                              705/37
12,165,223 B2 * 12/2024 Simpson ................ G06Q 50/06
(Continued)

FOREIGN PATENT DOCUMENTS

EP        3819857 A1 *   5/2021   .......... G06Q 20/389
JP     2003-150676        5/2003
(Continued)

OTHER PUBLICATIONS

Wei et al: "High Proportion Renewable Energy Supply and Demand Structure Model in 2050", Journal of Clean Energy Technologies, vol. 5, No. 2, Mar. 2017 (Year: 2017).*
(Continued)

*Primary Examiner* — Edward J Baird
(74) *Attorney, Agent, or Firm* — XSENSUS LLP

(57) ABSTRACT

An intermediary server for intermediating ownership of energy between a supplier and a user, includes circuitry that transmits a first request to another intermediary server capable of requesting a change of ownership of energy to a decentralized ledge system that manages energy information on energy, the first request requesting to change ownership of energy produced by a same production method as a particular production method, from another intermediary agent managing the other intermediary server to an intermediary agent managing the intermediary server.

16 Claims, 20 Drawing Sheets

(51) Int. Cl.
*H04L 9/00* (2022.01)
*G06Q 50/06* (2012.01)

(58) Field of Classification Search
CPC .... H02J 3/008; H02J 13/00032; Y02W 30/82; Y04S 50/10; Y04S 50/12
See application file for complete search history.

(56) References Cited

U.S. PATENT DOCUMENTS

| | | | | |
|---|---|---|---|---|
| 2010/0332275 | A1* | 12/2010 | Walsh | G06Q 50/06 705/37 |
| 2010/0332373 | A1* | 12/2010 | Crabtree | G06Q 40/04 709/224 |
| 2014/0074300 | A1* | 3/2014 | Shilts | G06Q 50/06 700/276 |
| 2016/0147242 | A1* | 5/2016 | Kaufman | G05B 15/02 700/291 |
| 2018/0054161 | A1* | 2/2018 | Ramachandran | H02J 7/35 |
| 2019/0164236 | A1 | 5/2019 | Mayne et al. | |
| 2019/0318425 | A1* | 10/2019 | Tilley | G06Q 20/223 |
| 2020/0136429 | A1* | 4/2020 | Susilo | H04W 4/38 |
| 2020/0175623 | A1* | 6/2020 | Howie | G06Q 50/18 |

FOREIGN PATENT DOCUMENTS

| | | | |
|---|---|---|---|
| JP | 2004-088847 | 3/2004 | |
| JP | 2019-049930 | 3/2019 | |
| JP | 2019-144851 | 8/2019 | |
| JP | 2019-169105 | 10/2019 | |
| KR | 10-2020-0002227 A | 1/2020 | |
| WO | WO-2019141511 A1 * | 7/2019 | ........... G06Q 10/063 |

OTHER PUBLICATIONS

U.S. Appl. No. 17/202,716, filed Mar. 16, 2021, 2021/0295454, Ryusuke Mayuzumi.
International Search Report issued on May 25, 2021 in PCT/JP2021/008719 filed on Mar. 5, 2021, 5 pages.
Extended European Search Report issued Feb. 15, 2024 in European Patent Application No. 21771713.1, 5 pages.

* cited by examiner

FIG. 7A

| USER ID | USER NAME | USER ADDRESS | SELECTABLE SUPPLIER ID |
|---|---|---|---|
| U0001 | CONSUMER Ca | TOKYO... | P0001, P0002, ... |
| U0002 | CONSUMER Cb | OSAKA... | P0001, P0004, ... |
| ... | ... | ... | ... |

FIG. 7B

| SUPPLIER ID | SUPPLIER NAME | PRODUCTION METHOD | AVAILABLE POWER (kWh) |
|---|---|---|---|
| P0001 | PRODUCER Aa | SOLAR | 100 |
| P0002 | PRODUCER Ab | OIL | 500 |
| ... | ... | ... | ... |

FIG. 8A

| USER ID | START DATE | END DATE | PLANNED CONSUMPTION (kWh) | USAGE RATIO OF RENEWABLE ENERGY (%) | SUPPLIER ID | SUPPLIER NAME | PRODUCTION METHOD |
|---|---|---|---|---|---|---|---|
| U0001 | 2020.1.1 | 2020.12.31 | 20 | 40 | P0001 | PRODUCER Aa | SOLAR |
| | | | | | P0002 | PRODUCER Ab | OIL |
| ... | ... | ... | ... | ... | ... | ... | ... |

FIG. 8B

USER ID: U0001

| USAGE DATE/TIME | USAGE AMOUNT (kWh) | PRODUCTION METHOD | TOTAL USAGE FOR SOLAR (kWh) | TOTAL USAGE FOR OIL (kWh) |
|---|---|---|---|---|
| 2020.1.1 0:00-0:30 | 10 | OIL | | 10 |
| 2020.1.1 0:30-1:00 | 10 | OIL | | 20 |
| ... | ... | ... | ... | ... |
| 2020.1.1 7:30-8:00 | 10 | OIL | | 160 |
| 2020.1.1 8:00-8:30 | 10 | SOLAR | 10 | |
| 2020.1.1 8:30-9:00 | 10 | SOLAR | 20 | |

FIG. 12A

USAGE REGISTRATION

START DATE [ ]

END DATE [ ]

PLANNED CONSUMPTION [ ] kWh

USAGE RATIO OF RENEWABLE ENERGY [ ] %

| SUPPLIER | PRODUCTION METHOD | AVAILABLE POWER (kWh) |
|---|---|---|
| ☐ PRODUCER Aa | SOLAR | 100 |
| ☐ PRODUCER Ab | OIL | 500 |
| ... | | |

[ CANCEL ]  [ OK ]

FIG. 12B

USAGE REGISTRATION

START DATE [ 2020. 1. 1 ]

END DATE [ 2020. 12. 31 ]

PLANNED CONSUMPTION [ 20 ] kWh

USAGE RATIO OF RENEWABLE ENERGY [ 40 ] %

| SUPPLIER | PRODUCTION METHOD | AVAILABLE POWER (kWh) |
|---|---|---|
| ☐ PRODUCER Aa | SOLAR | 100 |
| ☐ PRODUCER Ab | OIL | 500 |
| ... | | |

[ CANCEL ]  [ OK ]

FIG. 14
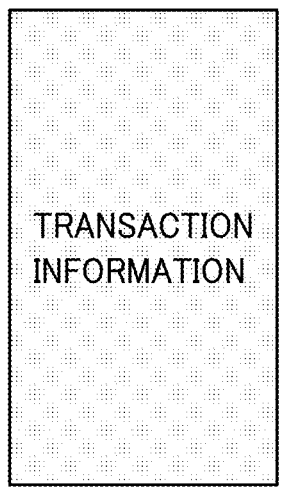
TRANSACTION ID: T0001
TRANSACTION TYPE: GENERATE ASSET INFORMATION
SUPPLIER: PRODUCER Aa
PROVISION DATE/TIME: 2020.1.1 9:00:00
AVAILABLE POWER (kWh): 10
PRODUCTION METHOD: SOLAR
OWNER: AGENT Da
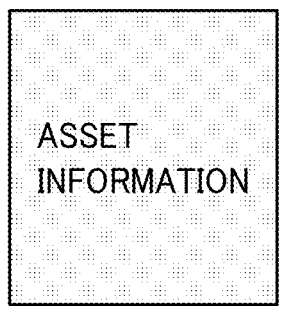
ASSET ID: A0001
SUPPLIER: PRODUCER Aa
PROVISION DATE/TIME: 2020.1.1 9:00:00
AVAILABLE POWER (kWh): 10
PRODUCTION METHOD: SOLAR
OWNER: AGENT Da
VALID DATE/TIME: 2020.1.31 23:59
TRANSACTION STATUS: NOT TRANSFERRED

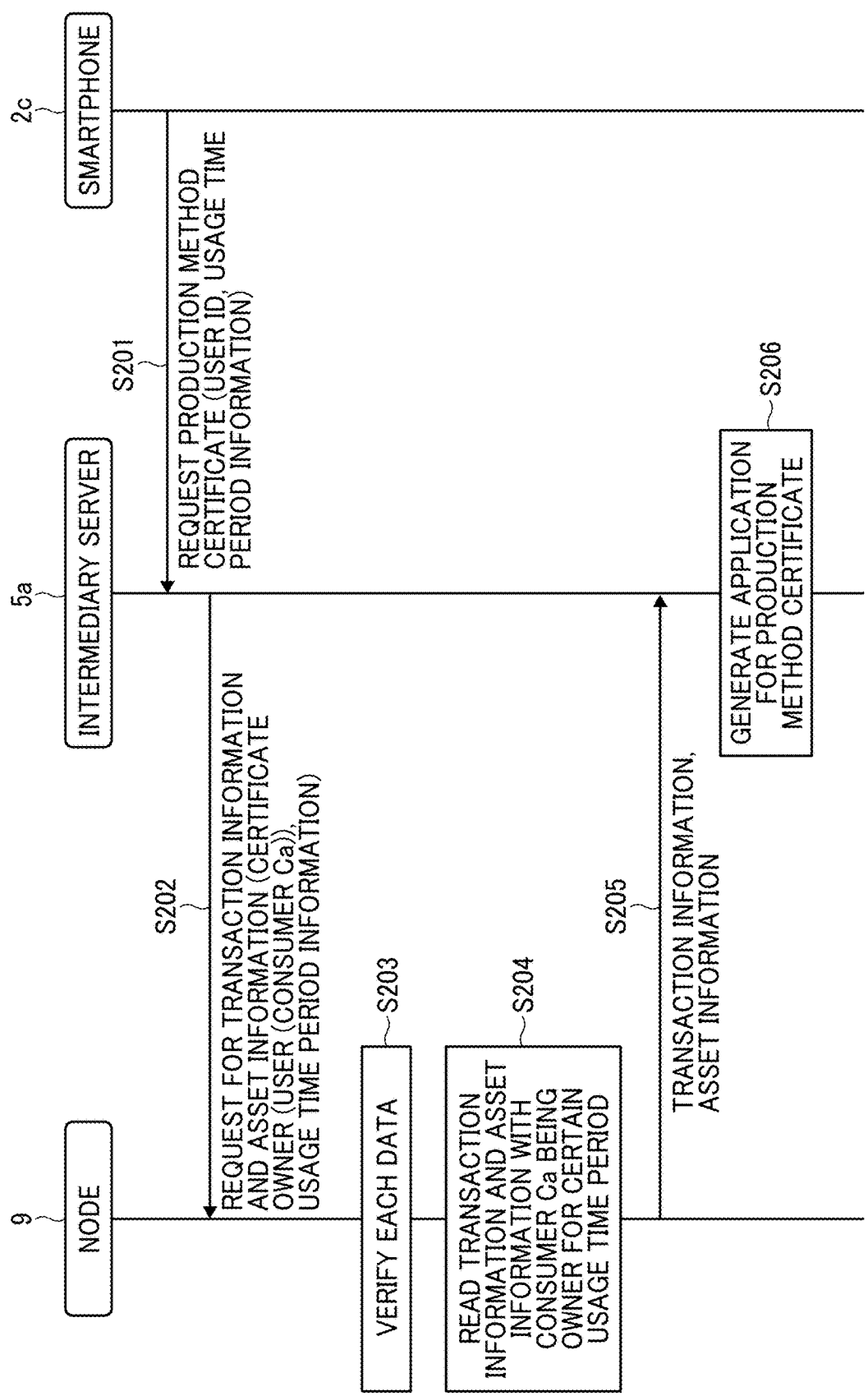

INTERMEDIARY SERVER, SYSTEM, INTERMEDIATING METHOD, AND NON-TRANSITORY RECORDING MEDIUM

CROSS-REFERENCE TO RELATED APPLICATIONS

This patent application is a continuation application of International Application No. PCT/JP2021/008719, filed on Mar. 5, 2021, which claims priority to Japanese Patent Application Nos. 2020-050115, filed on Mar. 19, 2020, 2020-088924, filed on May 21, 2020, and 2021-017719, filed on Feb. 5, 2021, in the Japan Patent Office, the entire disclosure of which is hereby incorporated by reference herein.

BACKGROUND

Technical Field

The present disclosure relates to an intermediary server, system, intermediating method, and non-transitory recording medium.

Related Art

In recent years, electricity produced from renewable energy has been attracting attention. In this disclosure, the electricity produced from renewable energy is electricity produced from a subset of renewable resources such as solar (solar light or solar heat), wind power, biomass, geothermal power, hydropower, and heat in the atmosphere. Compared to the case where the fossil fuel such as oil, coal, and liquefied natural gas is used to produce electricity, production of electricity using renewable energy emits almost no $CO_2$, which is a cause for global warming. That is, renewable energy is an energy resource that is environmentally friendly, from among various energy resources used for producing electricity today. By operating such as factories using the above-described power based on renewable energy, which is environmentally friendly, companies can increase brand credibility.

To stabilize electricity consumption, it is necessary to make an amount of electricity consumption and an amount of electricity supply equal in real time. In one example, supply (production) of electricity is adjusted to match demand (consumption) of electricity. In another example, a technique known as "demand response" may be applied, in which demand (consumption) of electricity is adjusted to match supply (production) of electricity.

In the demand response, consumption by customers may be reduced, since an amount of electricity consumption does not go over an amount of electricity supply. In the example case in which supply of electricity is adjusted to match demand, electric power companies or retailers may need to generate or purchase excessive power to match demand. This may cause increase in electricity charges, for example, due to increases in operational cost. In some cases, generated electricity may not be wasted in case electricity is not actually consumed.

SUMMARY

In an exemplary aspect, an intermediary server for intermediating ownership of energy between a supplier and a user, includes circuitry that transmits a first request to another intermediary server capable of requesting a change of ownership of energy to a decentralized ledge system that manages energy information on energy, the first request requesting to change ownership of energy produced by a same production method as a particular production method, from another intermediary agent managing the other intermediary server to an intermediary agent managing the intermediary server.

In an exemplary aspect, a system includes the above-described intermediary server, and the other intermediary server including circuitry transmits a second request requesting the decentralized ledger system to change ownership of energy produced by the same production method from the other intermediary agent to the intermediary agent.

In an exemplary aspect, a method for intermediating ownership of energy between a supplier and a user, includes transmitting a first request to another intermediary server capable of requesting a change of ownership of energy to a decentralized ledge system that manages energy information on energy, the first request requesting to change ownership of energy produced by a same production method as a particular production method, from another intermediary agent managing the other intermediary server to an intermediary agent managing the intermediary server.

In an exemplary aspect, a non-transitory recording medium which, when executed by one or more processors, cause the processors to perform a method for intermediating ownership of energy between a supplier and a user, including transmitting a first request to another intermediary server capable of requesting a change of ownership of energy to a decentralized ledge system that manages energy information on energy, the first request requesting to change ownership of energy produced by a same production method as a particular production method, from another intermediary agent managing the other intermediary server to an intermediary agent managing the intermediary server.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7A is a conceptual diagram illustrating an example of user management table;

FIG. 7B is a conceptual diagram illustrating an example of supplier management table;

FIG. 8A is a conceptual diagram illustrating an example of usage plan management table;

FIG. 8B is a conceptual diagram illustrating an example of usage history management table;

FIG. 12A is an illustration of an example usage plan registration screen before information is entered or selected;

FIG. 12B is an illustration of an example usage plan registration screen after information is entered or selected;

FIG. 14 is a conceptual diagram illustrating transaction information and asset information according to the exemplary embodiment;

FIG. 20 is a sequence diagram illustrating processing of facilitating a production method certificate of an asset, according to the exemplary embodiment.

Figure 1:
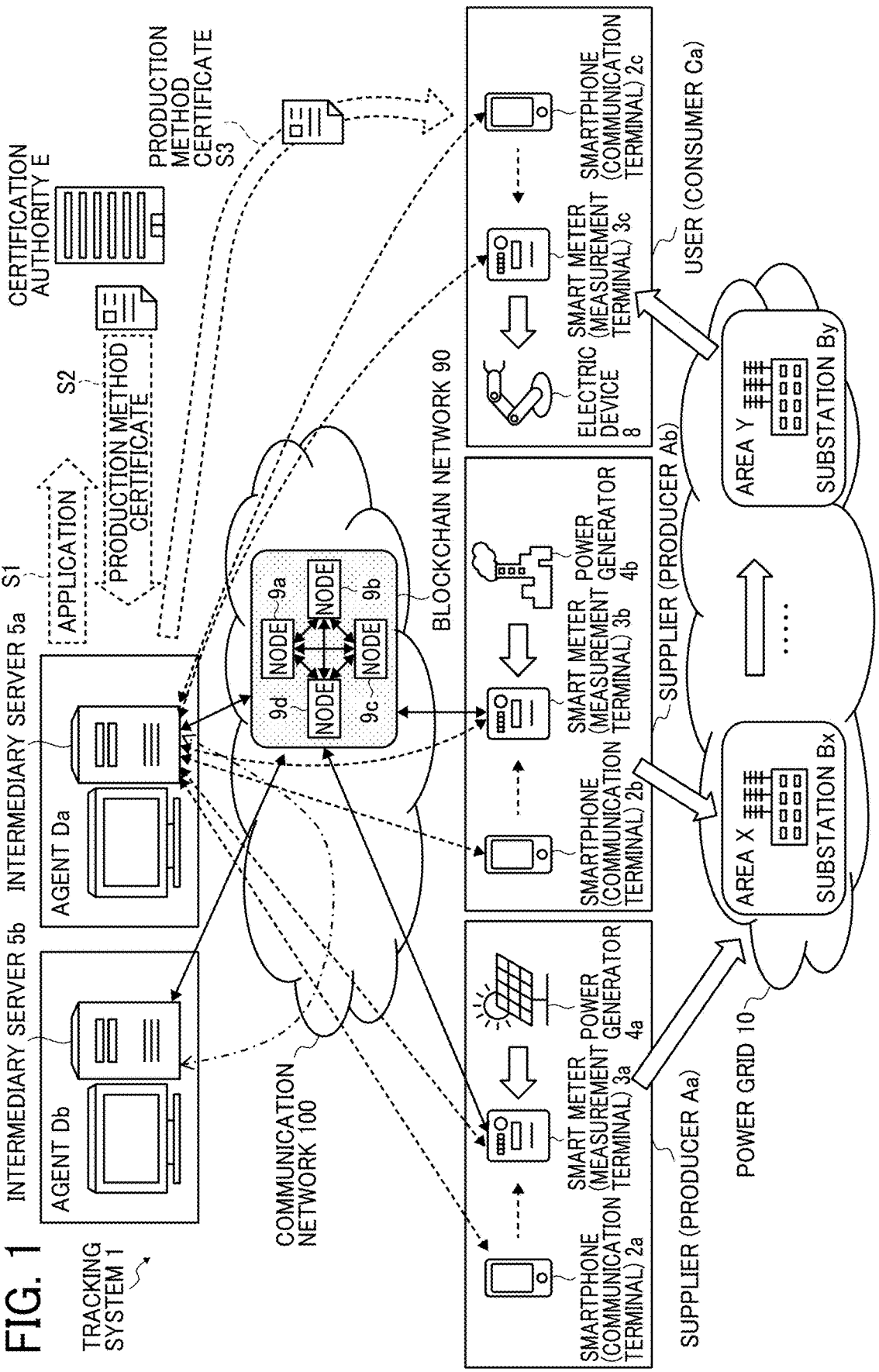
FIG. 1 is a schematic view illustrating a tracking system according to an exemplary embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail below, with reference to the drawings.

Overview of System Configuration:

First, overview of a configuration of a tracking system 1 is described according to one or more exemplary embodiments. FIG. 1 is a schematic view of an example of tracking system according to the present embodiment. Here, the case in which electricity, which is an example of energy, is used as an example of an asset is described. In this disclosure, the asset is an item that has value. The ownership of the asset and the production method of the asset are managed using asset information described later. The asset information is information on the asset, such as an ownership of the asset. Since the electricity, as an example of energy, is used as the asset in this example, the asset information may be referred to as energy information. Further, as described below, the transaction information is generated to generate or change the asset information. Since the transaction information is used to track ownership of the asset, the transaction information may be referred to as tracking information.

Explanation on Each Entity in the Tracking System:

As illustrated in FIG. 1, the tracking system 1 is used by a producer Aa of electricity, a producer Ab of electricity, a consumer Ca of electricity, an intermediary agent Da, an intermediary agent db, and a certification authority E.

Producer Aa, an example of a supplier, is an entity that produces electricity from solar light, as one example of an entity that produces electricity from renewable energy resource. In this disclosure, electricity produced from renewable energy resource is referred to as green power. Producer Ab, an example of a supplier, is an entity that produces electricity from oil as an example of fossil fuel. The supplier may be a union that purchases items from each producer and resells the items.

The consumer Ca, an example of a user, is an entity that consumes electricity supplied from the producer Aa or Ab. In case the asset is not consumed like electricity, such as in the case of a real estate property, the user may be an owner who currently owns the asset.

The intermediary agents Da and db are each an entity that intermediates transfer of ownership of electricity between different entities.

The certification authority E is a public institution such as a national or local public entity that certifies a certain type of electricity production method. Electricity production methods can be determined based on, for example, a type of energy resource used to produce electricity. Assuming that the electricity production method is defined by a type of energy resource, examples of electricity production method include a production method using solar (such as solar light or solar heat), a production method using wind (such as wind power), a production method using biomass, a production method using geothermal power, a production method using hydroelectric resources, a production method using heat in the atmosphere, and a production method using nuclear power. Of those various types of electricity production methods, the electricity production methods using renewable energy resources, such as solar light, solar heat, wind power, biomass, geothermal power, hydropower, and heat in the atmosphere are grouped into a production method using renewable energy. The electricity production methods using petroleum, coal, and liquefied natural gas are grouped into a production method using conventional energy such as fossil fuel. Compared to the production method using conventional energy, the production method using renewable energy emits almost no $CO_2$, which is a cause for global warming. That is, renewable energy is an energy resource that is environmentally friendly. In this disclosure, as examples of renewable energy resource, solar light or heat, wind power, biomass, geothermal power, hydropower, and heat in the atmosphere are referred, for the descriptive purposes. Further, as examples of conventional energy resource, fossil fuel, such as oil, coal, and liquefied natural gas are referred, for the descriptive purposes.

The intermediary agent Da, as an intermediator, sends an application form to the certification authority E by mail or the like on behalf of the customer Ca, receives a production method certificate of the customer Ca from the certification authority E, and sends the production method certificate to the consumer Ca by mail or the like. The production method certificate, for example, describes a usage ratio of renewable energy, which is a ratio that the customer Ca uses electricity produced from renewable energy, among electricity consumed by the customer Ca. With the production method certificate, the consumer Ca can apply for public subsidy, based on the renewable energy usage ratio (or $CO_2$ reduction rate) of the consumer Ca, or total usage of renewable energy of the consumer Ca.

The number of producers may be one or three or more. There may be multiple consumers or intermediary agents. Further, the number of intermediary agents may be three or more.

Power Transmission and Distribution Network:

The substation Bx is a substation nearest to the producers Aa and Ab. The substation By is a substation nearest to the consumer Ca. The power distribution network 10, which may be referred to as the power grid 10, includes substations Bx and By, and transmission lines, and distribution lines, etc. The electricity supplied from the producers Aa and Ab is distributed to the consumer Ca via the power grid 10.

Data Communication Network:

The producer Aa is equipped with a smartphone 2a, a smart meter 3a, and a power generator 4a. The producer Ab is equipped with a smartphone 2b, a smart meter 3b, and a power generator 4b. The consumer Ca is equipped with a smartphone 2c, a smart meter 3c, and an electric device 8. The intermediary agent Da manages an intermediary server 5a. The intermediary agent Da may be an organization such as a corporation or an individual (for example, a president, an executive officer, or an employee such as an information technology (IT) system administrator). The intermediary agent db manages an intermediary server 5b. The intermediary agent db may be an organization such as a corporation or an individual (for example, a president, an executive officer, or an employee such as an information technology (IT) system administrator).

The number of smartphones may be two or four or more, for example, depending on the number of producers and consumers. Hereinafter, the smartphones 2a, 2b, and 2c may be collectively referred to as the smartphone 2. Further, the number of smart meters may be two or four or more, for example, depending on the number of producers and consumers. Hereinafter, the smart meters 3a, 3b, and 3c may be collectively referred to as the smart meter 3. The number of power generators 4a and 4b may be one or three or more, for example, depending on the number of producers. Hereinafter, the power generators 4a and 4b may be collectively referred to as the power generator 4.

The intermediary agents 5a and 5b may be collectively referred to as the intermediary server 5. The number of intermediary servers 5a and 5b may be two or more, for example, depending on the number of intermediary agents. Further, the intermediary agent D is a general term for the intermediary agents Da and db. Further, the intermediary server 5 may be implemented by a single computer or a plurality of computers. The number of electric devices 8 may be two or more, for example, depending on the number of consumers.

As illustrated in FIG. 1, the tracking system 1 that resides on a data communication network includes the plurality of smartphones 2a, 2b, and 2c, the plurality of smart meters 3a, 3b, and 3c, the plurality of power generators 4a and 4b, the intermediary servers 5a and 5b, and a plurality of nodes 9a, 9b, 9c, and 9d each implemented by such as a computer. In this embodiment, the nodes 9a, 9b, 9c, and 9d form a blockchain network 90. The blockchain network 90 is formed on the communication network 100 such as the Internet. The communication network 100 includes the Internet, a mobile communication network, a local area network (LAN), and the like. The communication network 100 may include not only wired communication network but also wireless communication network such as mobile communication system (4G, 5G, 6G, etc.) and Worldwide Interoperability for Microwave Access (WiMAX). Although there are actually a large number of nodes exist, only four nodes 9a, 9b, 9c, and 9d are illustrated in the figure for simplicity. In this exemplary embodiment, the nodes 9a, 9b, 9c, and 9d are managed by different organizations such as different companies. The intermediary agent Da or db may be any one of these different organizations. For example, the intermediary server 5 and any one of the nodes 9a, 9b, 9c, and 9d may be managed by the same organization. Hereinafter, the nodes 9a, 9b, 9c, and 9d may be collectively referred to as the node 9.

Next, the terminals and devices of the producers Aa and Ab and the consumer Ca are described.

Terminals and Devices of Producer Aa:

The smartphone 2a communicates data with the smart meter 3a by short-range wireless technology such as Near Field Communication (NFC) or BLUETOOTH. Further, the smartphone 2a communicates data with the intermediary server 5 via the communication network 100.

The smart meter 3a communicates data with the intermediary server 5 via the communication network 100. Further, the smart meter 3a measures an amount of electricity produced by the power generator 4a every predetermined time period (for example, every 30 minutes). The smart meter 3a performs processing such as requesting the node 9 of the blockchain network 90 to generate asset information indicating the amount of asset that can be provided such as electric power and the ownership of such asset.

The power generator 4a is a device that generates electricity from solar light.

Terminals and Devices of Producer Ab:

The smartphone 2b communicates data with the smart meter 3b by short-range wireless technology such as NFC or BLUETOOTH. Further, the smartphone 2b communicates data with the intermediary server 5 via the communication network 100.

The smart meter 3b communicates data with the intermediary server 5 via the communication network 100. Further, the smart meter 3b measures an amount of electricity produced by the power generator 4b every predetermined time period (for example, every 30 minutes). The smart meter 3b performs processing such as requesting the node 9 of the blockchain network 90 to generate asset information indicating the amount of asset that can be provided such as electric power and the ownership of such asset.

The power generator 4b is a device that generates electricity from oil.

Terminals and Devices of Consumer Ca:

The smartphone 2c communicates data with the smart meter 3c by short-range wireless technology such as NFC or BLUETOOTH. Further, the smartphone 2c communicates data with the intermediary server 5 via the communication network 100.

The smart meter 3c communicates data with the intermediary server 5 via the communication network 100. Further, the smart meter 3c measures an amount of electricity consumed by the electric device 8 every predetermined time period (for example, every 30 minutes). The smart meter 3c performs processing such as transmitting usage information indicating the amount of electricity consumed, and a duration of time when electricity is consumed, etc., to the intermediary server 5 via the communication network 100. In the present embodiment, since the intermediary server 5 accesses the blockchain network 90 on behalf of the smart meter 3c, the smart meter 3c does not need to directly access the blockchain network 90. To access the blockchain network 90 on behalf of the smart meter 3c, the intermediary server 5 previously stores, in the storage unit 5000, a certificate of the consumer Ca that is required to access the blockchain network 90.

The electric device 8 is any device that is operated with electricity supplied by the consumers Aa and/or Ab.

Intermediary Server of Intermediary Agent Da:

The intermediary server 5 intermediates transaction of asset between a supplier and a user. Specifically, the intermediary agent intermediates ownership of asset between the supplier and the user. In this disclosure, the example case in which the asset, which is an item, is electricity is described. To facilitate transaction of asset, the intermediary server 5 communicates data with each smartphone 2 (as the user) and each smart meter 3 (as the supplier) via the communication network 100. Further, the intermediary server 5 accesses the blockchain network 90 to enable tracking of transaction of asset. In example operation, the intermediary server 5 accesses the node 9 of the blockchain network 90 to communicate data with the node 9. In the example case of asset being electricity, the tracking system 1 tracks electricity from the supplier to the user.

The smartphones 2a and 2b are examples of communication terminals of the suppliers. The smartphone 2c is an example of a communication terminal of the user. Examples of communication terminal also include smart watches, PCs, and smart glasses. The smart meter 3 is an example of a measurement terminal.

Figure 2:
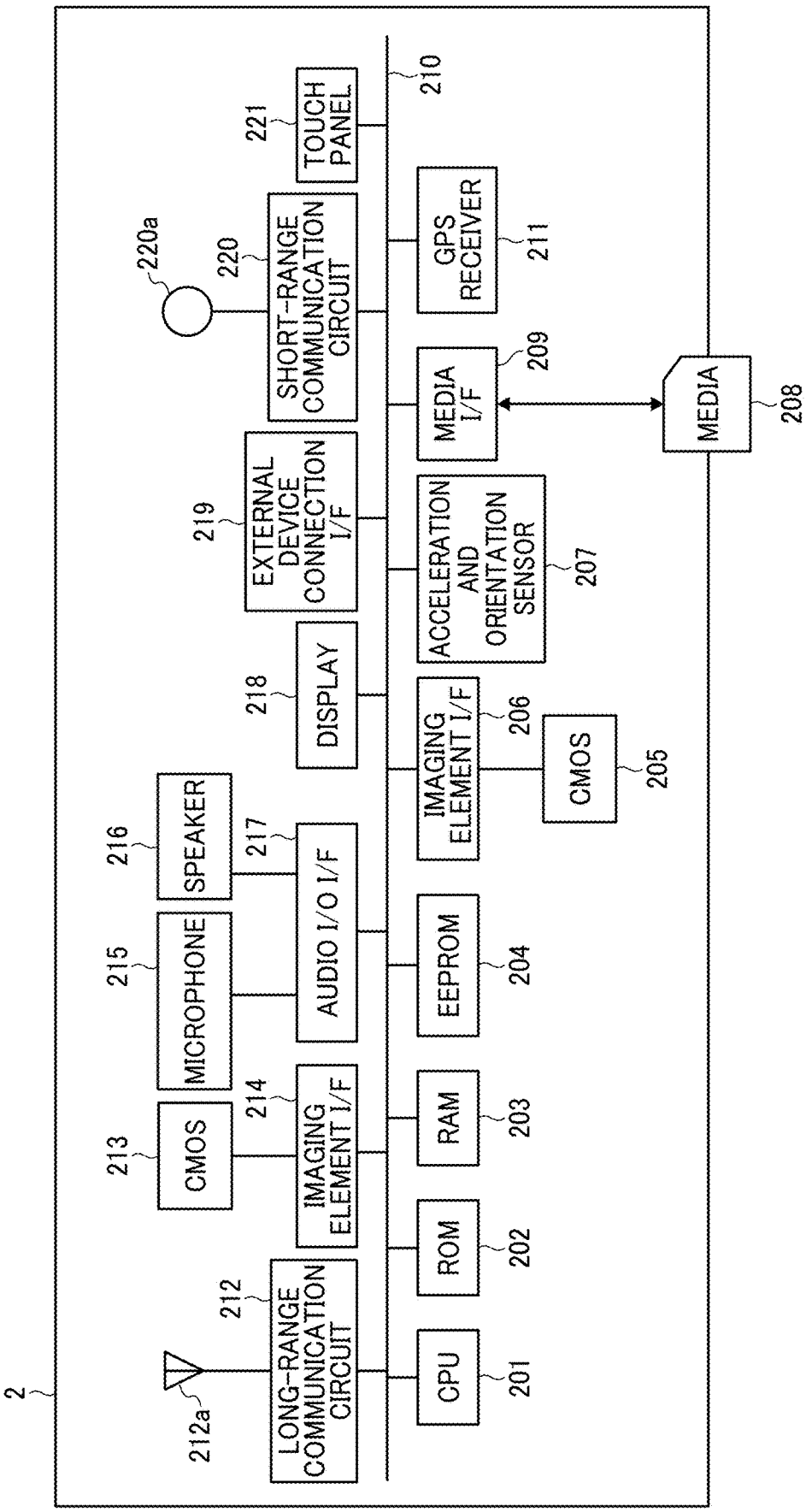
FIG. 2 is a schematic diagram illustrating a hardware configuration of a smartphone according to the exemplary embodiment.
Figure 3:
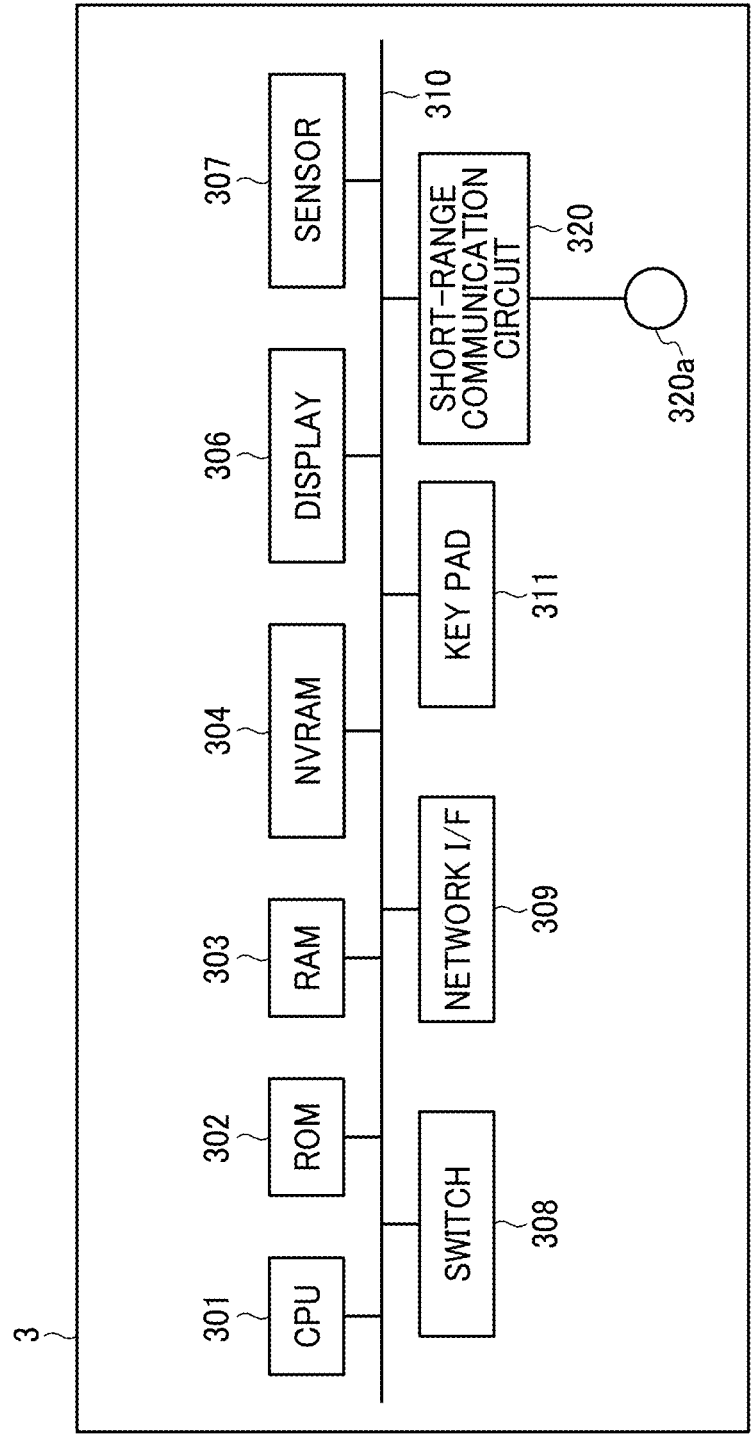
FIG. 3 is a schematic diagram illustrating a hardware configuration of a smart meter according to the exemplary embodiment.
Figure 4:
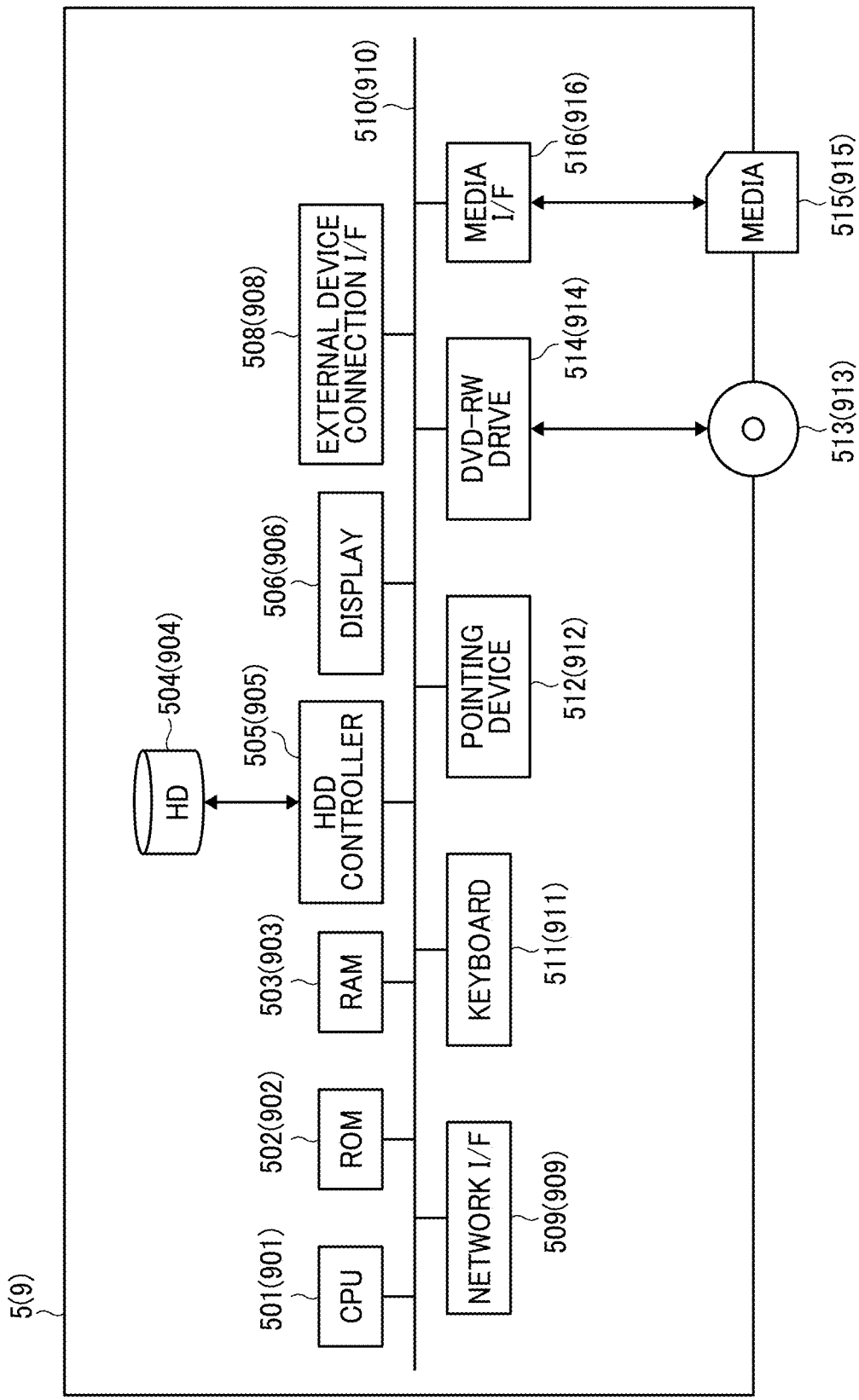
FIG. 4 is a schematic diagram illustrating a hardware configuration of an intermediary server according to the exemplary embodiment.

Hardware Configuration:

Next, referring to FIGS. 2 to 4, hardware configurations of the smartphone 2, the smart meter 3, the intermediary server 5, and the node 9 are described according to the embodiment.

Hardware Configuration of Smartphone:

FIG. 2 is a schematic diagram illustrating a hardware configuration of a smartphone according to the exemplary embodiment. As illustrated in FIG. 2, the smartphone 2 includes a central processing unit (CPU) 201, read only memory (ROM) 202, random access memory (RAM) 203, Electrically Erasable Programmable ROM (EEPROM) 204, Complementary Metal Oxide Semiconductor (CMOS) sensor 205, imaging element interface (I/F) 206, acceleration and orientation sensor 207, media I/F 209, and Global Positioning System (GPS) receiver 211.

The CPU 201 controls entire operation of the smartphone 2. The ROM 202 stores a control program for controlling the CPU 201, such as an initial program loader (IPL). The RAM 203 is used as a work area for the CPU 201. The EEPROM 204 reads or writes various data such as a control program for a smartphone under control of the CPU 201. The CMOS sensor 205 is an example of a built-in imaging device that captures an object (mainly, a self-image of a user operating the smartphone 2) under control of the CPU 201 to obtain image data. In alternative to the CMOS sensor 205, an imaging element such as a charge-coupled device (CCD) sensor can be used. The imaging element I/F 206 is a circuit that controls driving of the CMOS sensor 205. The acceleration and orientation sensor 207 includes various sensors such as an electromagnetic compass or gyrocompass for detecting geomagnetism and an acceleration sensor. The media I/F 209 controls reading and writing (storing) of data from and to a storage medium (media) 208 such as a flash memory. The GPS receiver 211 receives a GPS signal from a GPS satellite.

The smartphone 2 further includes a long-range communication circuit 212, a CMOS sensor 213, an imaging element I/F 214, a microphone 215, a speaker 216, an audio input/output I/F 217, a display 218, an external device connection I/F 219, a short-range communication circuit 220, an antenna 220a for the short-range communication circuit 220, and a touch panel 221.

The long-range communication circuit 212 is a circuit that enables the smartphone 2 to communicate with other device through the communication network 100. The CMOS sensor 213 is an example of a built-in imaging device that captures an object under control of the CPU 201 to obtain image data. The imaging element I/F 214 is a circuit that controls driving of the CMOS sensor 213. The microphone 215 is a built-in circuit that converts audio into an electric signal. The speaker 216 is a built-in circuit that generates audio such as music or voice by converting an electric signal into physical vibration. The audio input/output I/F 217 is a circuit for inputting or outputting an audio signal between the microphone 215 and the speaker 216 under control of the CPU 201. The display 218 is an example of a display device that displays an image of the object, various icons, etc. Examples of the display 218 include a liquid crystal display (LCD) and an organic electroluminescence (EL) display. The external device connection I/F 219 is an interface that connects the smartphone 2 to various external devices. The short-range communication circuit 220 is a communication circuit that communicates in compliance with the near field communication (NFC), the BLUETOOTH, and the like. The touch panel 221 is an example of an input device that allows a user to operate the smartphone 2 by touching a screen of the display 218.

The smartphone 2 further includes a bus line 210. The bus line 210 is an address bus or a data bus, which electrically connects the components illustrated in FIG. 2 such as the CPU 201.

Hardware Configuration of Smart Meter:

FIG. 3 is a schematic diagram illustrating an example of hardware configuration of the smart meter. As illustrated in FIG. 3, the smart meter 3 is provided with a computer. Still referring to FIG. 3, the smart meter 3 includes a CPU 301, ROM 302, RAM 303, non-volatile RAM (NVRAM) 304, display 306, measurement sensor 307, switch 308, network I/F 309, keypad 311, short-range communication circuit 320, and antenna 320a for the short-range communication circuit 320.

The CPU 301 controls entire operation of the smart meter 3. The ROM 302 stores a control program for driving the CPU 301 such as an IPL. The RAM 303 is used as a work area for the CPU 301. The NVRAM 304 is a non-volatile memory that stores and reads various data such as the control program. The display 306 displays various information such as a cursor, a menu, a window, a character, or an image.

The measurement sensor 307 measures electricity provided or consumed by the smart meter 3. The switch 308 is turned on to close, or turned off to open, the connections in an electric circuit to cause the electric current flow or stop in the electric circuit in the smart meter 3.

The network I/F 309 is an interface for communicating data via the communication network 100 including the blockchain network 90 such as the Internet. The keypad 311 is an example of input device provided with a plurality of keys for inputting or selecting characters, numerals, or various instructions. The short-range communication circuit 320 is a communication circuit that enables communication based on short-range wireless technology such as NFC and BLUETOOTH. The bus line 310 is an address bus or a data bus, which electrically connects the components illustrated in FIG. 3 such as the CPU 301.

Hardware Configuration of Intermediary Server:

FIG. 4 is a schematic diagram of a hardware configuration of the intermediary server according to the exemplary embodiment. Hardware components of the intermediary server 5 are designated by reference numerals in 500 series. As illustrated in FIG. 4, the intermediary server 5 is implemented by a computer. Specifically, the intermediary server 5 of FIG. 4 includes a CPU 501, ROM 502, RAM 503, hard disk (HD) 504, hard disk drive (HDD) controller 505, display 506, external device connection I/F 508, network I/F 509, bus line 510, keyboard 511, pointing device 512, Digital Versatile Disk Rewritable (DVD-RW) drive 514, and media I/F 516.

The CPU 501 controls entire operation of the intermediary server 5. The ROM 502 stores a control program for driving the CPU 501, such as an IPL. The RAM 503 is used as a work area for the CPU 501. The HD 504 stores various data such as the control program. The HDD controller 505 controls reading or writing of various data with respect to the HD 504 under control of the CPU 501. The display 506 displays various information such as cursors, menus, windows, characters, or images. The external device connection I/F 508 is an interface that connects the intermediary server 5 to various external devices. Examples of the external devices include, but not limited to, a universal serial bus (USB) memory and a printer. The network I/F 509 is an interface that controls communication of data with an external device through the communication network 100. The bus line 510 is an address bus, a data bus or the like, which electrically connects the elements illustrated in FIG. 4 such as the CPU 501.

The keyboard 511 is one example of an input device provided with a plurality of keys for allowing a user to input characters, numerals, or various instructions. The pointing device 512 is an example of an input device that allows a user to select or execute various instructions, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or Blu-ray Disc. The media I/F 516 controls reading and writing (storing) of data from and to a storage medium (media) 515 such as a flash memory.

Hardware Configuration of Node:

FIG. 4 is a schematic diagram also illustrating an example of hardware configuration of the node. Hardware components of the node 9 are designated by reference numerals in 900 series. As illustrated in FIG. 4, since the node 9, which is implemented by a computer, has the same configuration as the intermediary server 5, description of hardware configuration thereof is omitted.

Figure 5:
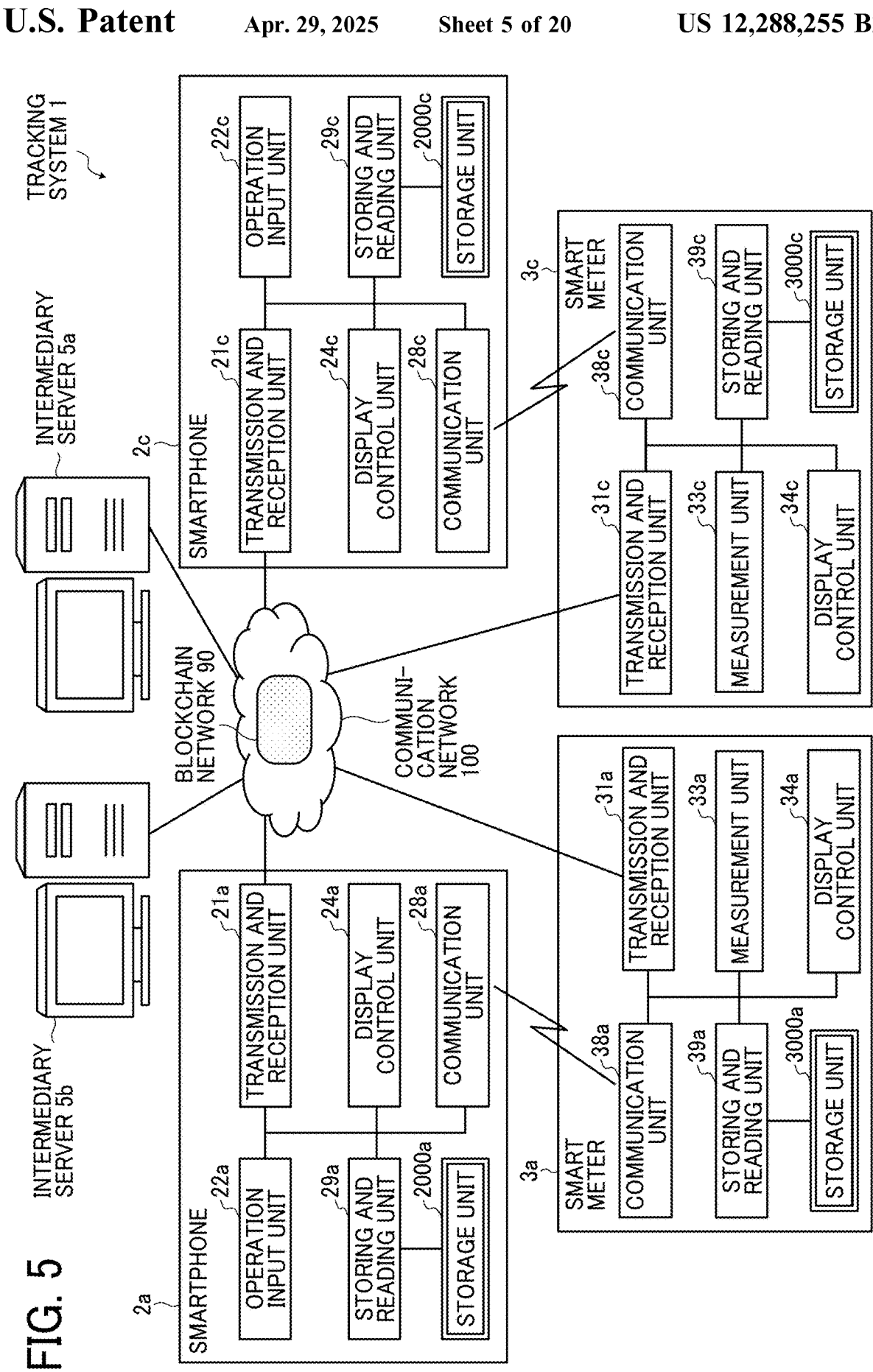
FIG. 5 is a schematic block diagram illustrating functional configurations of the smartphone and the smart meter in the tracking system of FIG. 1, according to the exemplary embodiment.

Functional Configuration:

Next, referring to FIGS. 5 to 8, a functional configuration of each terminal and device of the tracking system 1 is described according to the exemplary embodiment. FIG. 5 is a schematic block diagram illustrating an example functional configuration of the smartphone and the smart meter in the tracking system.

Functional Configuration of Smartphone 2a:

As illustrated in FIG. 5, the smartphone 2a includes a transmission and reception unit 21a, an operation input unit 22a, a display control unit 24a, a communication unit 28a, and a storing and reading unit 29a. These units are caused to function by operating one or more hardware components illustrated in FIG. 2 in cooperation with instructions of the CPU 201 according to the control program for smartphone loaded from the EEPROM 204 to the RAM 203.

Further, the smartphone 2a includes a storage unit 2000a implemented by the ROM 202, the RAM 203, and the EEPROM 204 illustrated in FIG. 2.

Each functional element of the smartphone 2a: The transmission and reception unit 21a of the smartphone 2a, which is implemented mainly by instructions of the CPU 201 with respect to the long-range communication circuit 212, controls transmission or reception of various data (or information) to or from other device (for example, the intermediary server 5) via the communication network 100.

The operation input unit 22a, which is mainly implemented by instructions of the CPU 201 with respect to the touch panel 221, receives various selections or inputs from the user.

The display control unit 24a, which is mainly implemented by instructions of the CPU 201, controls the display 218 to display various images. The display control unit 24a further provides a web browser function.

The communication unit 28a, which is mainly implemented by instructions of the CPU 201 with respect to the short-range communication circuit 220, communicates various data with a communication unit 38a, to be described later, of the smart meter 3a. In the case of wired communication, the smartphone 2 is connected to the smart meter 3a via a communication cable to communicate data.

The storing and reading unit 29a, which is mainly implemented by instructions of the CPU 201, stores various data (or information) in the storage unit 2000a and reads various data (or information) from the storage unit 2000a.

Functional Configuration of Smartphone 2c:

As illustrated in FIG. 5, the smartphone 2c includes a transmission and reception unit 21c, an operation input unit 22c, a display control unit 24c, a communication unit 28c, and a storing and reading unit 29c. These units are caused to function by operating one or more hardware components illustrated in FIG. 2 in cooperation with instructions of the CPU 201 according to the control program for smartphone loaded from the EEPROM 204 to the RAM 203.

Further, the smartphone 2c includes a storage unit 2000c implemented by the ROM 202, the RAM 203, and the EEPROM 204 illustrated in FIG. 2.

The respective units of the smartphone 2c (transmission and reception unit 21c, operation input unit 22c, display control unit 24c, communication unit 28c, and storing and reading unit 29c) are substantially the same in function to corresponding units of the smartphone 2a (transmission and reception unit 21a, operation input unit 22a, display control unit 24a, communication unit 28a, and storing and reading unit 29a), so that description thereof is omitted.

Similarly to the smartphone 2c, the smartphone 2b is substantially the same in function to the smartphone 2a, but FIG. 5 omits the smartphone 2b as the smartphone 2b is not referred below.

Functional Configuration of Smart Meter 3a:

As illustrated in FIG. 5, the smart meter 3a includes a transmission and reception unit 31a, a measurement unit 33a, a display control unit 34a, a communication unit 38a, and a storing and reading unit 39a. These units are caused to function by operating one or more hardware components illustrated in FIG. 3 in cooperation with instructions of the CPU 301 according to the control program for smart meter loaded from the NVRAM 304 to the RAM 303.

Further, the smart meter 3a includes a storage unit 3000a implemented by the ROM 302, the RAM 303, and the NVRAM 304 illustrated in FIG. 3.

Each functional element of the smart meter 3a: The transmission and reception unit 31a of the smart meter 3a, which is implemented mainly by instructions of the CPU 301 with respect to the network I/F 309, controls transmission or reception of various data (or information) to or from other device (for example, the intermediary server 5) via the communication network 100.

The measurement unit 33a, which is implemented mainly by instructions of the CPU 301 with respect to the measurement sensor 307, measures the amount of electricity generated by the power generator 4a.

The display control unit 34a, which is mainly implemented by the instructions of the CPU 301, controls the display 306 to display various images.

The communication unit 38a, which is mainly implemented by the instructions of the CPU 301 with respect to the short-range communication circuit 320, communicates various data with the communication unit 28a of the smartphone 2a. In the case of wired communication, the smartphone 2 is connected to the smart meter 3a via a communication cable to communicate data.

The storing and reading unit 39a, which is mainly implemented by instructions of the CPU 301, stores various data (or information) in the storage unit 3000a and reads various data (or information) from the storage unit 3000a.

Functional Configuration of Smart Meter 3c:

As illustrated in FIG. 5, the smart meter 3c includes a transmission and reception unit 31c, a measurement unit 33c, a display control unit 34c, a communication unit 38c, and a storing and reading unit 39c. These units are caused to function by operating one or more hardware components illustrated in FIG. 3 in cooperation with instructions of the CPU 301 according to the control program for smart meter loaded from the NVRAM 304 to the RAM 303.

Further, the smart meter 3a includes a storage unit 3000c implemented by the ROM 302, the RAM 303, and the NVRAM 304 illustrated in FIG. 3.

The respective units of the smart meter 3c (transmission and reception unit 31c, measurement unit 33c, display control unit 34c, communication unit 38c, and storing and reading unit 39c) are substantially the same in function to corresponding units of the smart meter 3a (transmission and reception unit 31a, measurement unit 33a, display control unit 34a, communication unit 38a, and storing and reading unit 39a), so that description thereof is omitted.

Similarly to the smart meter 3c, the smart meter 3b is substantially the same in function to the smart meter 3a, but FIG. 5 omits the smart meter 3b as the smart meter 3b is not referred in the following description.

Figure 6:
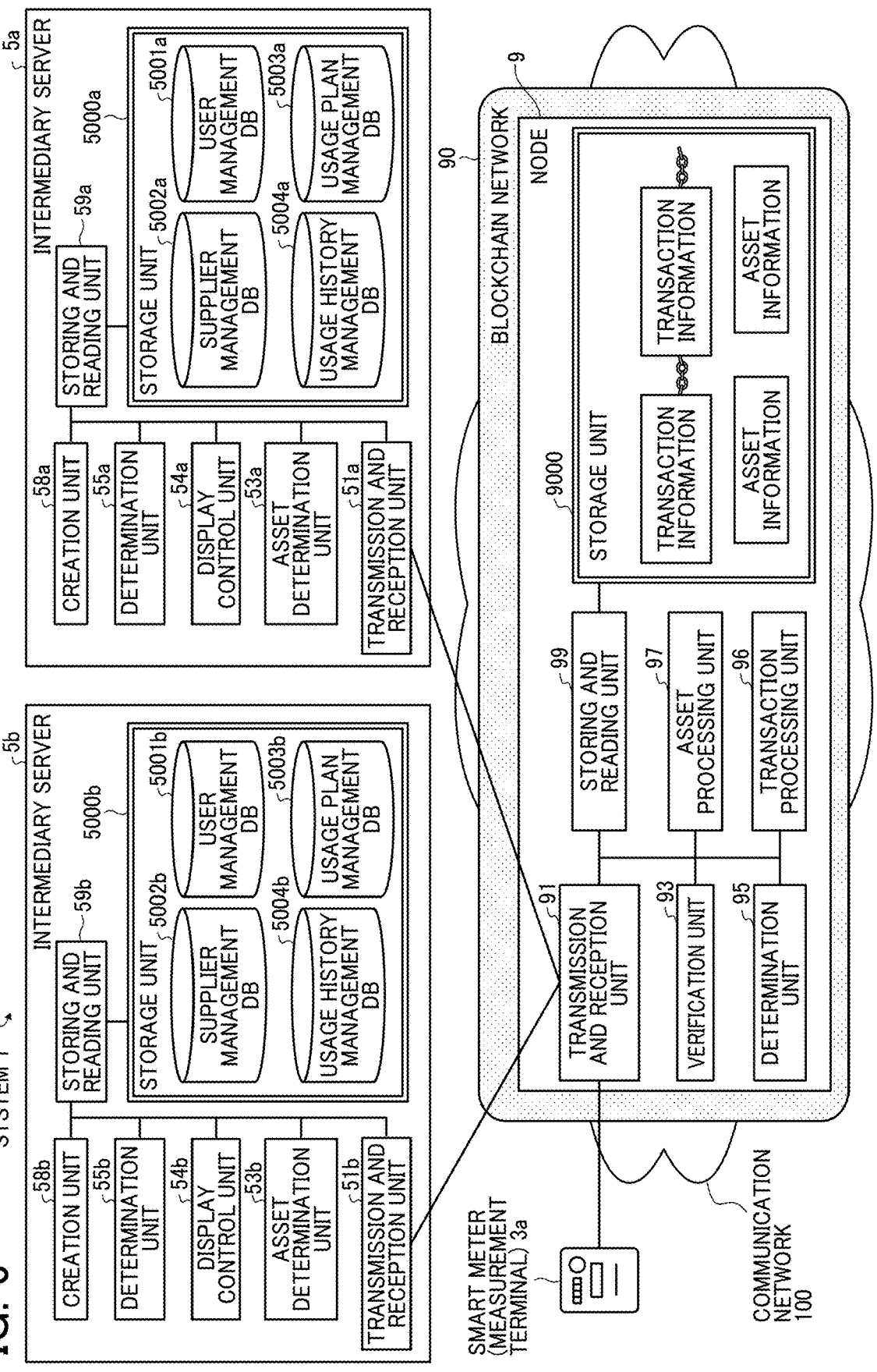
FIG. 6 is a schematic block diagram illustrating a functional configuration of the intermediary server and the node in the tracking system of FIG. 1, according to the exemplary embodiment.

Functional Configuration of Intermediary Server 5a:

For simplicity, FIG. 6 also illustrates a block diagram of a functional configuration of each of the intermediary server 5a and 5b. FIG. 6 is a schematic block diagram illustrating a functional configuration of the intermediary server and the node in the tracking system according to the exemplary embodiment. As illustrated in FIG. 6, the intermediary server 5a includes a transmission and reception unit 51a, an asset determination unit 53a, a display control unit 54a, a determination unit 55a, a creation unit 58a, and a storing and reading unit 59a. These units are caused to function by operating one or more hardware components illustrated in FIG. 4 in cooperation with instructions of the CPU 501 according to the control program for the intermediary server loaded from the HD 504 to the RAM 503.

Further, the intermediary server 5a includes a storage unit 5000a implemented by the ROM 502 and the HD 504 illustrated in FIG. 4.

(User Management Table)

FIG. 7A is a conceptual diagram illustrating an example of user management table. The user management table is a table used by the intermediary agent Da to manage information on each user such as a consumer of electricity. Specifically, the storage unit 5000a includes a user management DB 5001a, such as a user management table as illustrated in FIG. 7A. The user management table stores, for each user, a user ID, a user name, a user's address (or location where the user resides), and a selectable supplier ID in association.

Of these items, the user ID is an example of user identification information for identifying the user of an asset, such as the consumer Ca of electricity. The selectable supplier ID is an example of supplier identification information for identifying a supplier, such as a producer of electricity, which can be selected by the user identified with the user ID. For example, if the user's address is in Tokyo, the selectable suppliers are limited to those suppliers that have addresses in or around Tokyo.

(Supplier Management Table)

FIG. 7B is a conceptual diagram illustrating an example of supplier management table. The supplier management table is a table used by the intermediary agent Da to manage each supplier such as a producer of electricity. The storage unit 5000a stores a supplier management DB 5002a, which is implemented by the supplier management table as illustrated in FIG. 7B. The supplier management table includes, for each supplier, a supplier ID, a supplier name, an asset (such as electricity) production method of the supplier, and an amount of asset that can be supplied from the supplier, in association.

Of these items, the supplier ID is an example of supplier identification information for identifying the supplier of asset such a producer of electricity. The production method is determined based on a type of energy resource used to produce the asset (electricity). As described above, examples of production method include a production method using solar (solar light or solar heat), a production method using wind power, a production method using biomass, a production method using geothermal power, a production method using hydroelectric power, a production method using oil, a production method using coal, and a production method using liquefied natural gas. The above-described production methods may be classified into one or more groups, such as the group of production methods using renewable energy or the group of production methods using conventional energy such as fossil fuel. The amount that can be supplied is an amount of assets that can be supplied by a supplier for a certain time period. In case the supplier is a producer of electricity, the amount that can be supplied is an amount of electric energy that can be supplied for a unit of time (here, one hour) (kWh).

(Usage Plan Management Table)

FIG. 8A is a conceptual diagram illustrating an example of usage plan management table. The usage plan management table is a table used for managing information on planned usage of asset, set by the user such as the consumer Ca. The storage unit 5000*a* includes a usage plan management DB 5003*a*, which is implemented by the usage plan management table as illustrated in FIG. 8A. The usage plan management table includes information on details of usage that the user previously sets for future. Here, the example case in which the asset is electricity is described. Specifically, the usage plan management table includes a user ID of a user, usage start date, usage end date, planned usage amount (planned consumption), renewable energy usage ratio, supplier ID of a supplier, a supplier name of the supplier, and production method of asset, in association. The same data items stored both in the tables of FIGS. 7A and 7B, such as the user ID, are each designated with the same item name.

Of these, the usage start date is information indicating the date when the user such as the consumer Ca starts using the asset such as electricity. The usage end date is information indicating the date when the user ends using the asset such as electricity. The planned usage amount is the amount of asset that the user plans to use for a certain time period, and can be expressed in terms of electric energy (kWh). The renewable energy usage ratio is information indicating a ratio (%) of assets (electricity) produced from renewable energy such as solar light, with respect to total amount of assets (electricity) to be used by the user such as the consumer Ca during a certain time period such as a period between the start date and the end date.

(Usage History Management Table)

FIG. 8B is a conceptual diagram illustrating an example of usage history management table. The usage history management table is a table for managing a history (log) of usage of asset that the intermediary server 5*a* transfers its ownership from the supplier to the user. The storage unit 5000*a* includes a usage history management DB 5004*a*, such as the usage history management table as illustrated in FIG. 8B for each user. The usage history management table manages usage history information, specifically, the usage date and time, the usage amount, the production method of asset in use, and the total (accumulated) usage amount by production method, in association. Specifically, in this disclosure, the usage history management table manages a log of electricity consumption for each user by production method. From this perspective, the usage history management table of FIG. 8B indicates the date and time of electricity consumption, the amount of electricity consumption, the production method of electricity being consumed, and the total amount of electricity consumption by production method. The production method is determined based on a type of resource (such as an energy resource) used to produce asset (such as electricity). For example, when the asset is electricity, one example of production method corresponds to one or more processes of producing electricity from solar such as solar light using various technologies. Although this embodiment describes a case in which one production method uses solar light and another production method uses oil, any other type of production method (for example, production method using wind power or production method using coal) may be used. Further, the above-described production methods may be classified into one or more groups, such as the group of production methods using renewable energy or the group of production methods using conventional energy such as fossil fuel.

Of the usage history information, the same data items stored in the tables of FIGS. 7A and 7B, such as the user ID, are each designated with the same item name. In this example, the usage date and time indicates the date and time when ownership of asset is transferred, specifically, the date and time when the intermediary server 5*a* transfers the ownership of the asset acquired from the supplier, such as the producer, to the user such as the consumer Ca. The usage amount indicates an amount of asset that the intermediary server 5*a* acquires its ownership from the supplier and provides the acquired ownership to the user. In this example case, the amount of asset, which is electricity, is represented by, for example, electric energy (kWh). The total usage amount indicates a total amount of assets, which are produced by a specific production method and allocated to a user such as the consumer Ca for a certain period of time, and is expressed in total electric energy (kWh), for example. Before transfer of ownership of asset, the intermediary server 5*a* refers to a record of the user in the usage history management DB 5004*a* to determine a production method of asset to be allocated to the user such as the consumer Ca. For example, when the renewable energy usage ratio set by the consumer Ca is 40% as illustrated in FIG. 8A, the intermediary server 5*a* refers to the total usage amount for solar in the usage history management DB 5004*a*, to determine a production method of asset to be provided to the consumer Ca.

In this example, since the planned usage amount (for example, 20 kWh) illustrated in FIG. 8A is a planned usage amount for every hour, the usage amount will be half the planned usage amount (for example, 10 kWh), when transferring the ownership of asset is performed every 30 minutes as illustrated in FIG. 8B.

Although this embodiment describes a case in which one production method uses solar light and another production method uses oil, any other type of production method (for example, production method using wind power or production method using coal) may be used. Further, the above-described production methods may be classified into one or more groups, such as the group of production methods using renewable energy or the group of production methods using conventional energy such as fossil fuel.

Furthermore, the production method may be determined based on a type of asset production process. When any one of processes in producing the asset such as electricity differs, the asset production processes are different, such that the production methods differ from each other. In one example, even when the same energy resource, such as solar, is used to produce electricity, if different technologies used for producing electricity (such as one using solar light and other using solar heat) differ, the resultant processes are different such that they belong to different production methods. In another example, if different machines are used or not used (such as a case when a turbine is used, or not used, to produce electricity), the resultant processes are different such that they belong to different production methods.

Each Functional Unit of Intermediary Server:

Next, each function unit of the intermediary server 5*a* is described in detail with reference to FIG. 6, according to the exemplary embodiment. The transmission and reception unit 51a of the intermediary server 5a, which is implemented mainly by instructions of the CPU 501 with respect to the network I/F 509, controls transmission or reception of various data (or information) to or from other device (for example, the smartphone 2a, 2c) via the communication network 100. The transmission and reception unit 51a also serves as a reception unit that receives the planned usage, described later, from the smartphone 2c.

The asset determination unit 53a, which is implemented by the instructions of the CPU 501, determines asset information indicating an ownership of the asset (the asset that the intermediary server 5a intermediates transfer of ownership) to be transferred to the user. For example, it is assumed that the intermediary agent Da intermediates transfer of ownership of asset, produced by a specific type of production method, for the consumer Ca. In such case, the asset determination unit 53a determines asset information on such asset, based on "history of usage of asset produced by the specific type of production method for a specific user (customer Ca)" stored in the usage history management DB 5004a, and "renewable energy usage ratio" stored in the usage plan management DB 5003a. Specifically, when the renewable energy usage ratio for the consumer Ca is set to 40%, the asset determination unit 53a refers to the total usage amount of solar in the usage history management DB 5004a, to determine to transfer ownership of asset produced from renewable energy, from the intermediary agent Da (managing the intermediary server 5a) to the consumer Ca, until the renewable energy usage ratio reaches 40%.

The display control unit 54a, which is mainly implemented by the instructions of the CPU 501, controls the display 506 to display various images, or controls the display 218 of the smartphone 2 to display various images via the communication network 100. In this case, the smartphone 2 displays various images using functions provided by the web browser of the display control unit 24 of the smartphone 2. The display control units 24a and 24c may be collectively referred to as the display control unit 24.

The determination unit 55a, which is implemented by the instructions of the CPU 501, makes various determinations.

The creation unit 58a, which is implemented by the instructions of the CPU 501, creates an application form to be submitted by the intermediary agent to the certification authority E, based on the transaction information and the asset information. This application form is a predetermined application form, which is used to apply for a production method certificate, certifying that the asset is produced by a certain type of production method.

The storing and reading unit 59a, which is mainly implemented by the instructions of the CPU 501, stores various data (or information) in the storage unit 5000a and reads various data (or information) from the storage unit 5000a.

Functional Configuration of Intermediary Server 5b:

As illustrated in FIG. 6, the intermediary server 5b includes a transmission and reception unit 51b, an asset determination unit 53b, a display control unit 54b, a determination unit 55b, a creation unit 58b, and a storing and reading unit 59b. These units are caused to function by operating one or more hardware components illustrated in FIG. 4 in cooperation with instructions of the CPU 501 according to the control program for the intermediary server loaded from the HD 504 to the RAM 503.

Further, the intermediary server 5b includes a storage unit 5000b implemented by the ROM 502 and the HD 504 illustrated in FIG. 4. These units are caused to function by operating one or more hardware components illustrated in FIG. 4 in cooperation with instructions of the CPU 501 according to the control program for the intermediary server loaded from the HD 504 to the RAM 503.

Further, the intermediary server 5b includes a storage unit 5000b implemented by the ROM 502 and the HD 504 illustrated in FIG. 4.

The respective units of the intermediary server 5b (transmission and reception unit 51b, asset determination unit 53b, display control unit 54b, determination unit 55b, creation unit 58b, and storing and reading unit 59b) are substantially the same in function to corresponding units of the intermediary server 5a (transmission and reception unit 51a, asset determination unit 53a, display control unit 54a, determination unit 55a, creation unit 58a, and storing and reading unit 59a), so that description thereof is omitted. Further, the storage unit 5000b of the intermediary server 5b stores a user management DB 5001b, a supplier management DB 5002b, a usage plan management DB 5003b, and a usage history management DB 5004b, which are similar in function to the user management DB 5001a, supplier management DB 5002a, usage plan management DB 5003a and usage history management DB 5004a of the intermediary server 5a, respectively.

Functional Configuration of Node 9:

As illustrated in FIG. 6, the node 9 includes a transmission and reception unit 91, a verification unit 93, a determination unit 95, a transaction processing unit 96, an asset processing unit 97, and a storing and reading unit 99. These units are caused to function by operating one or more hardware components illustrated in FIG. 4 in cooperation with instructions of the CPU 901 according to the control program for the node loaded from the HD 904 to the RAM 903.

The node 9 further includes a storage unit 9000, which is implemented by the ROM 902 and the HD 904 illustrated in FIG. 4. For the descriptive purposes, FIG. 6 illustrates a state in which transaction information is connected like a chain. The node 9 further stores asset information (an example of energy information) generated based on the transaction information. The transaction information and the asset information are stored in each node.

Functional Unit of Node:

Next, each functional unit of the node 9 is described in detail with reference to FIG. 6. The transmission and reception unit 91 of the node 9, which is implemented mainly by instructions of the CPU 901 with respect to the network I/F 909, controls transmission or reception of various data (or information) to or from other node of the blockchain network 90 on the communication network 100. The transmission and reception unit 91 transmits or receives various data (or information) between the transmission and reception unit 31a of the smart meter 3a and the transmission and reception unit 51 of the intermediary server 5. Although the smart meter 3b is not illustrated in FIG. 6, the transmission and reception unit 91 actually transmits or receives various data (or information) to or from the smart meter 3b.

The verification unit 93, which is implemented by the instructions of the CPU 901, verifies the certificate and the provided information. The certificate verification is a process of determining whether or not a target certificate is a certificate of the entity that is registered in advance in the node 9. The verification of the provided information is a process of determining whether or not all predetermined contents are entered in predetermined format (for example, whether the supplier is entered or the provision time period is entered).

The determination unit 95, which is implemented by the instructions of the CPU 901, makes various determinations.

The transaction processing unit 96, which is implemented by the instructions of the CPU 901, performs processing such as generating transaction information indicating a transaction causing generation of asset information and storing the transaction information in the storage unit 9000.

The asset processing unit 97, which is implemented by the instructions of the CPU 901, performs processing such as generating asset information according to the transaction information and storing the asset information in the storage unit 9000.

The storing and reading unit 99, which is mainly implemented by the instructions of the CPU 901, stores various data (or information) in the storage unit 9000 and reads various data (or information) from the storage unit 9000.

Processing or Operation:

Next, referring to FIGS. 9 to 20, processing or operation performed by the tracking system is described according to the embodiment.

Figure 9:
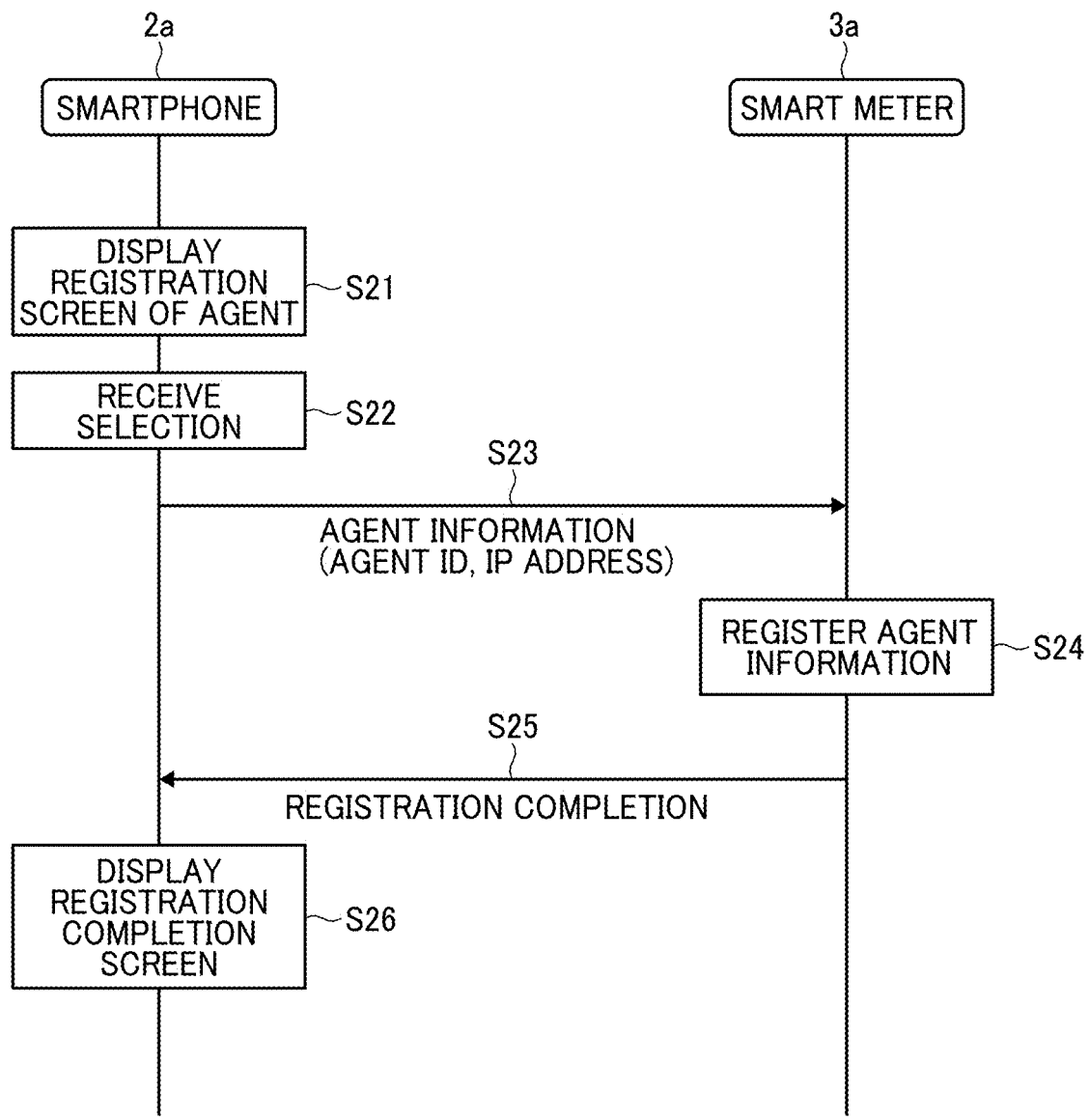
FIG. 9 is a sequence diagram illustrating example processing of registering intermediary agents.
Figure 10A:
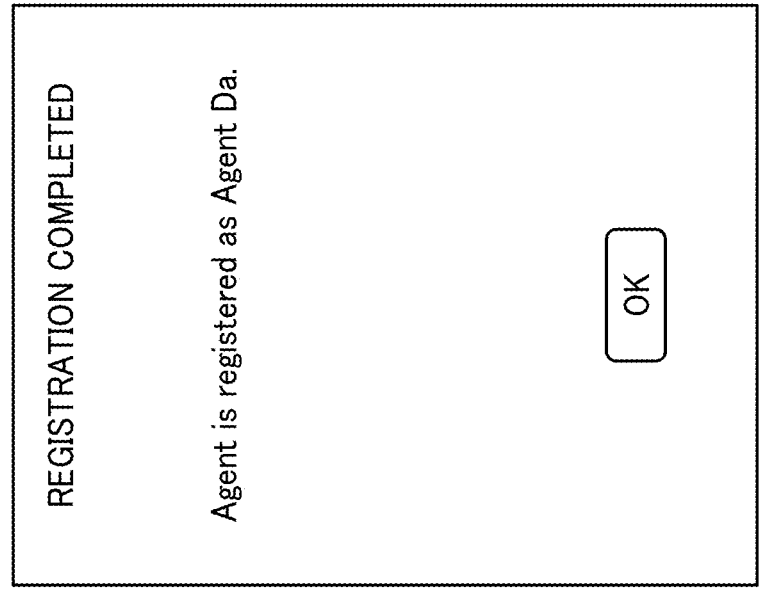
FIG. 10A is an illustration of an example intermediary agent registration screen.
Figure 10B:
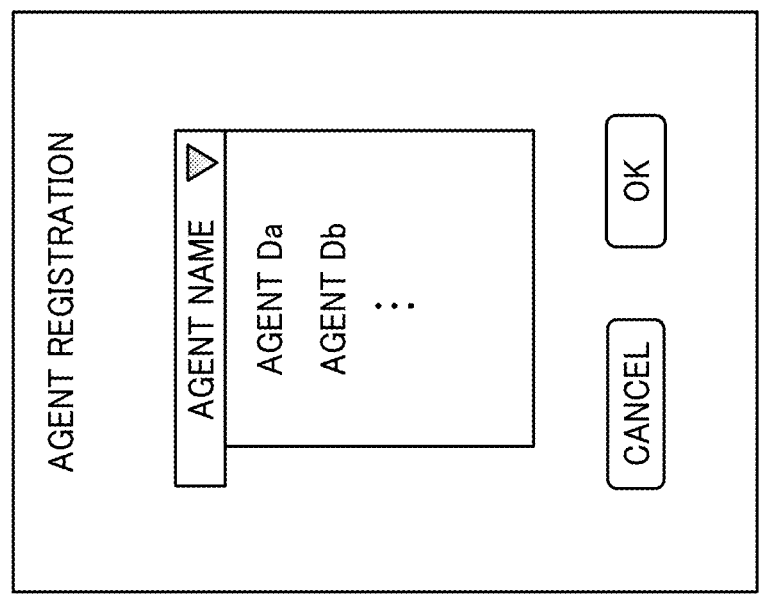
FIG. 10B is an illustration of an example intermediary agent registration completion screen.

Registration of Intermediary Agent:

Next, referring to FIGS. 9 and 10, processing of registering intermediary agents is described according to the exemplary embodiment. FIG. 9 is a sequence diagram illustrating example processing of registering intermediary agents. FIG. 10A is an illustration of an example intermediary agent registration screen. FIG. 10B is an illustration of an example intermediary agent registration completion screen. The following describes an example case in which the producer Aa registers the intermediary agent Da, from among a plurality of intermediary agents. It is assumed that the producer Aa previously makes a contract with the intermediary agent Da, such that the producer Aa is able to select the intermediary agent Da as described later. The smartphone 2a is installed with an application program that allows the producer Aa to register intermediary agents. This application program allows the smartphone 2a to obtain various information on each intermediary agent, such as an intermediary agent ID for identifying the intermediary agent, a name of the intermediary agent, and an internet protocol (IP) address of an intermediary server of the intermediary agent, which are stored in association.

As illustrated in FIG. 9, at the smartphone 2a, the display control unit 24a controls the display 218 to display the intermediary agent registration screen illustrated in FIG. 10A (S21). The intermediary agent registration screen displays a pull-down menu, which lists a plurality of intermediary agent names to allow the producer Aa to select a particular intermediary agent. The intermediary agent registration screen further includes, at its lower part, an "OK" button to be pressed to confirm the intermediary agent name selected from the pull-down menu, and a "CANCEL" button to be pressed to cancel the selection.

When the producer Aa selects a desired intermediary agent name from the plurality of intermediary agent names and presses the "OK" button, the operation input unit 22a receives the selection on the intermediary agent (S22). Here, the case where the intermediary agent Da is selected is described.

After the operation input unit 22a receives the selection, the communication unit 28a transmits information on the selected intermediary agent to the communication unit 38a of the smart meter 3a by short-range wireless communication (S23). The intermediary agent information includes an intermediary agent ID for identifying the selected intermediary agent and an IP address of an intermediary server of the selected intermediary agent. Accordingly, the communication unit 38a of the smart meter 3a receives the intermediary agent information.

Next, at the smart meter 3a, the storing and reading unit 39a registers the intermediary agent information in the storage unit 3000a (S24). With this information on the registered agent, the smart meter 3a is able to communicate with the intermediary server 5 of the registered agent to request various processing. Then, the communication unit 38a transmits registration completion information indicating that registration of the intermediary agent is completed to the smartphone 2a (S25). Accordingly, the communication unit 28a of the smartphone 2a receives the registration completion information.

Next, at the smartphone 2a, the display control unit 24a controls the display 218 to display the registration completion screen as illustrated in FIG. 10B (S26). The registration completion screen displays a message indicating that registration of the intermediary agent is completed. The registration completion screen further includes an "OK" button to be pressed by the producer Aa to close the screen being displayed. When the producer Aa presses the "OK" button, the registration completion screen is closed.

The processing of registering the intermediary agent thus ends.

Figure 11:
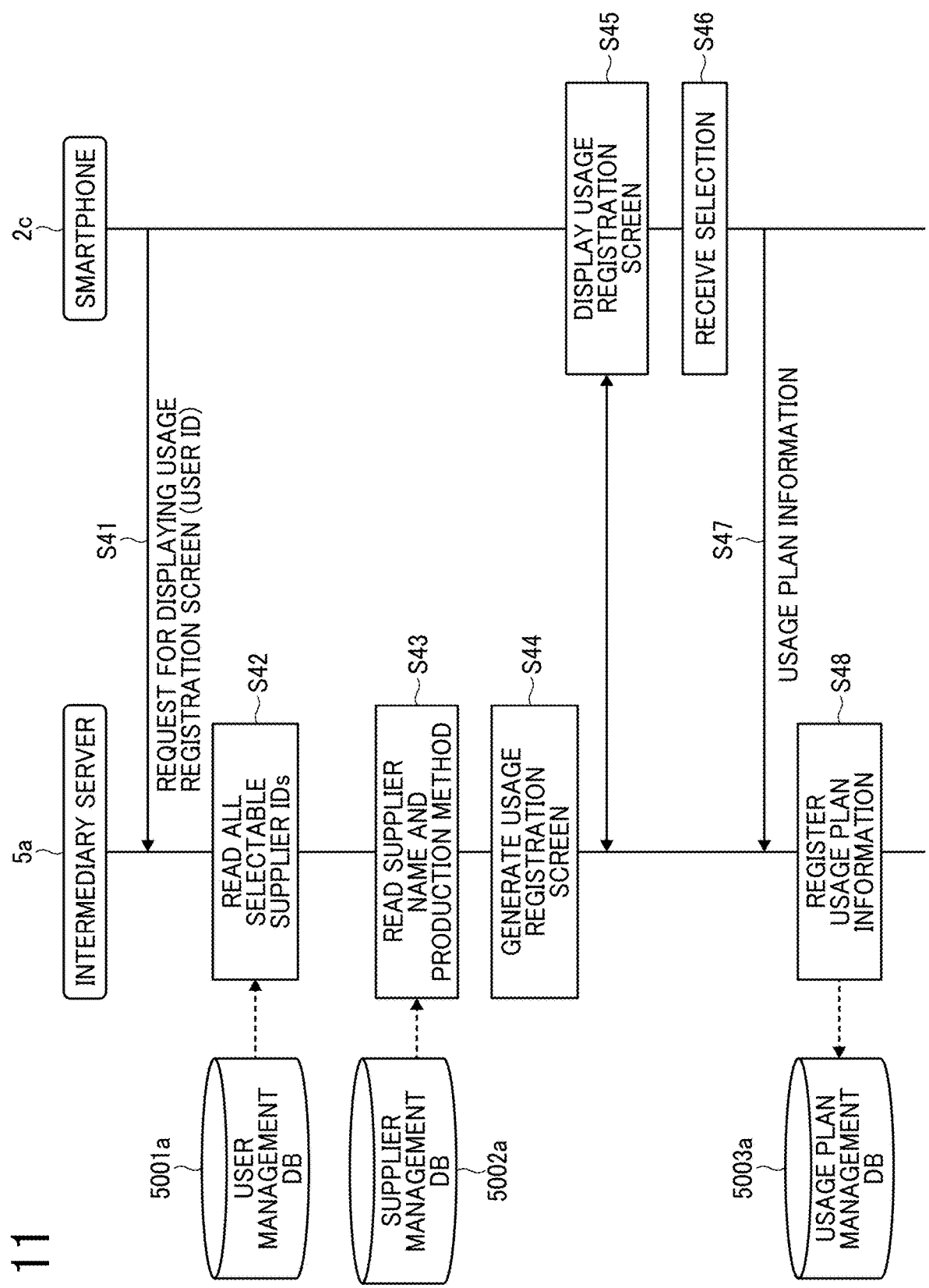
FIG. 11 is a sequence diagram illustrating processing of registering usage plan of assets according to the exemplary embodiment.

Processing of Registering Usage Plan:

Next, referring to FIGS. 11 and 12, processing of registering usage plan is described according to the exemplary embodiment. FIG. 11 is a sequence diagram illustrating processing of registering planned usage of assets according to the embodiment. FIG. 12A is an illustration of an example usage plan registration screen before information is entered or selected. FIG. 12B is an illustration of an example usage plan registration screen after information is entered or selected. The following describes the example case in which the consumer Ca registers the planned usage of electricity, as an asset, to the intermediary server 5a using the smartphone 2c.

As illustrated in FIG. 11, the transmission and reception unit 21c of the smartphone 2c transmits a request for displaying a usage plan registration screen to the intermediary server 5a via the communication network 100 (S41). The display request includes a user ID for identifying the consumer Ca as a user who is the request source. Accordingly, the transmission and reception unit 51a of the intermediary server 5a receives the display request. The user ID is an example of user identification information. When the user is an individual, examples of the user identification information include any number for uniquely identifying an individual, which may be designated by a public institution such as a social security number in the U.S. and a my number in Japan, and a telephone number of the individual. When the user is an organization such as a company, examples of the user identification information include any number for uniquely identifying a company, such as a telephone number of the company.

Next, at the intermediary server 5a, the storing and reading unit 59a searches the user management DB 5001a (see FIG. 7A) using the user ID received at S41 as a search key, to read out all selectable supplier IDs associated with the user ID (S42). Further, the storing and reading unit 59a searches the supplier management DB 5002a using each supplier ID read at S42 as a search key, to read out various information on each supplier (supplier name, production method, and amount that can be supplied) (S43). The display control unit 54a generates a trading details registration screen as illustrated in FIG. 12A based on the information on each supplier read at S43 (S44). Accordingly, at the smartphone 2c, the display control unit 24c uses its web browser function to display, on the display 218 of the smartphone 2c, the usage plan registration screen illustrated in FIG. 12A that is generated by the intermediary server 5a (S45). The usage plan registration screen includes a plurality of fields for entering usage start date, usage end date, planned usage amount, and renewable energy usage ratio, and a plurality of check boxes each for selecting a supplier of the asset. The asset, in this case, is electricity. The usage plan registration screen further includes, at its bottom, an "OK" button to be pressed to confirm the usage plan such as the entered items of the input fields and the checked boxes, and a "CANCEL" button to be pressed to cancel all the trading details having been entered.

Here, the consumer Ca operates the touch panel of the smartphone 2c to enter any desired numerical value in each input field. The consumer Ca further checks a check box of any desired supplier. When the consumer Ca presses the "OK" button, the operation input unit 22c receives the entered and checked items as the usage plan (S46). The renewable energy usage ratio indicates a ratio of renewable energy to total energy, which is planned to be used to produce electricity that the consumer Ca wants to acquire.

Here, the consumer Ca selects the producer Aa that produces electricity from solar light as energy. However, since the producer Aa does not produce any electricity at night, the consumer Ca additionally selects the producer Ab that produces electricity from oil. The renewable energy usage ratio is set to 40%.

Next, the transmission and reception unit 21c of the smartphone 2c transmits usage plan information indicating the entered and selected items to the intermediary server 5a via the communication network 100 (S47). Accordingly, the transmission and reception unit 51a of the intermediary server 5a receives the usage plan information.

Next, at the intermediary server 5a, the storing and reading unit 59a stores, in the usage plan management DB 5003a (see FIG. 8A), the usage plan information received at S47 in association with the user ID received at S41 (S48).

Figure 13:
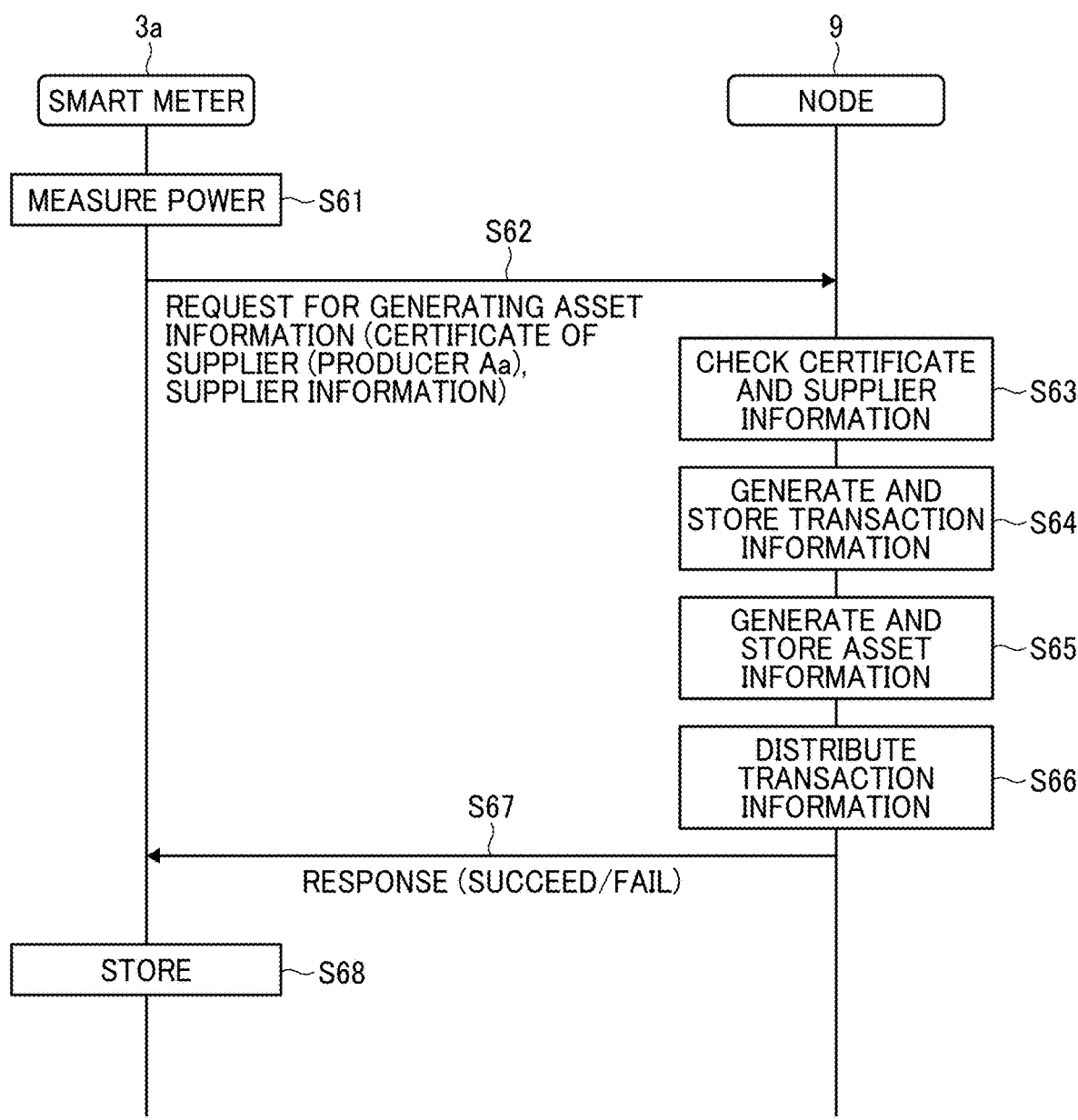
FIG. 13 is a sequence diagram illustrating processing of setting the intermediary agent as an owner of the asset provided by the supplier, according to the exemplary embodiment.

The processing of registering usage plan thus ends.
Processing of Setting the Intermediary Agent as an Owner of the Asset:

Referring now to FIGS. 13 and 14, processing of setting the intermediary agent as an owner of the asset provided by the supplier is described, according to the embodiment. FIG. 13 is a sequence diagram illustrating processing of setting the intermediary agent as an owner of the asset provided by the supplier, according to the embodiment. FIG. 14 is a conceptual diagram illustrating transaction information and asset information according to the embodiment. The following describes the example case in which the smart meter 3a of the producer Aa requests the node 9a to set the intermediary agent as an owner of the asset.

As illustrated in FIG. 13, the measurement unit 33a measures electricity supplied from the power generator 4a to the power grid 10 (S61). The transmission and reception unit 31a of the smart meter 3a transmits a request for generating asset information to one of the nodes 9 (such as the node 9a) of the blockchain network 90 every predetermined time (for example, every 30 minutes) (S62). This request includes an electronic certificate certifying that the producer Aa is a legitimate registered supplier, and supplier information, so that the smartphone 2a of the producer Aa as the supplier can access the blockchain network 90. The supplier information includes various information on the supplier of the asset, such as the supplier ID or name, the date and time that asset is supplied, an available amount of asset, a production method of asset, and an owner of asset. Accordingly, the transmission and reception unit 91 of the node 9a receives the request for generating asset information (S62). This supplier information is information used for generating the transaction information illustrated in FIG. 14. The contents of the supplier information are determined in advance by a smart contract of the blockchain (contract automation).

Next, the verification unit 93 of the node 9a verifies the certificate and the supplier information received at S62 (S63). The following describes the example case in which the verification result indicates that verification is successful.

Next, the transaction processing unit 96 uses the supplier information received at S62 to generate transaction information as illustrated in FIG. 14 and stores the transaction information in the storage unit 9000 (S64). In this case, the transaction processing unit 96 assigns a transaction ID and sets a transaction type. The transaction information includes a transaction ID, transaction type, and supplier information (supplier name or ID, provision date and time, available amount (power), production method, and owner).

Of these items, the transaction ID is an example of unique identification information for identifying transaction information. The transaction type is information indicating a type of processing to be performed in relation to the asset subjected to transaction. In FIG. 14, since the transaction type is generation of asset information, the asset processing unit 97 generates asset information. The supplier ID is identification information identifying a supplier of asset. The provision date and time is information indicating the date and time when the asset is supplied from the supplier. The available amount is information indicating an amount of electricity (electric energy) that the supplier can provide within a certain time period defined by the provision date and time. The type of production method is information indicating a production method of asset illustrated in FIG. 8B. The owner is information indicating an owner of asset, who has ownership of the asset.

Next, the asset processing unit 97 generates the asset information illustrated in FIG. 14 according to the transaction information illustrated in FIG. 14 and stores the asset information in the storage unit 9000 (S65). In this case, the asset processing unit 97 sets, as items of the asset information, the supplier information (supplier ID, date and time of provision, available amount, production method, and owner) in the transaction information, the transaction valid date and time, and the transaction status of the asset information. The transaction valid date and time is set, for example, one month after the date and time of provision. Further, the transaction status is information indicating whether or not the asset information has been transferred (assigned or not) to the user by the intermediary server 5. In FIG. 14, the transaction status of "not transferred" indicates that the asset has not been transferred to (allocated to) the user, that is, the intermediary agent has not yet provided the asset information to the user.

Further, the transmission and reception unit 91 of the node 9a distributes the transaction information generated at S64 as a block to the other nodes 9 (the nodes 9b, 9c, and 9d) of the blockchain network 90 (S66). Each of the other nodes 9 verifies the block, and adds the verified block to a chain of blocks already saved in each node. Each of the other nodes 9 then generates asset information in the same manner as S65 according to the transaction information, and stores the asset information in each storage area. A plurality of items of transaction information may be stored in one block.

Next, the transmission and reception unit 91 of the node 9 transmits a response to the smart meter 3a in response to the request received at S62 (S67). The response indicates whether generation of asset information is successful or fails. Accordingly, the transmission and reception unit 31a of the smart meter 3a receives the response.

Next, at the smart meter 3a, the storing and reading unit 39a stores contents of the response in the storage unit 3000a (S68).

As described above, the asset information indicating that the owner of the asset is the intermediary agent Da is managed on the blockchain network, to complete processing of providing asset information from the supplier to the intermediary agent.

Figure 15:
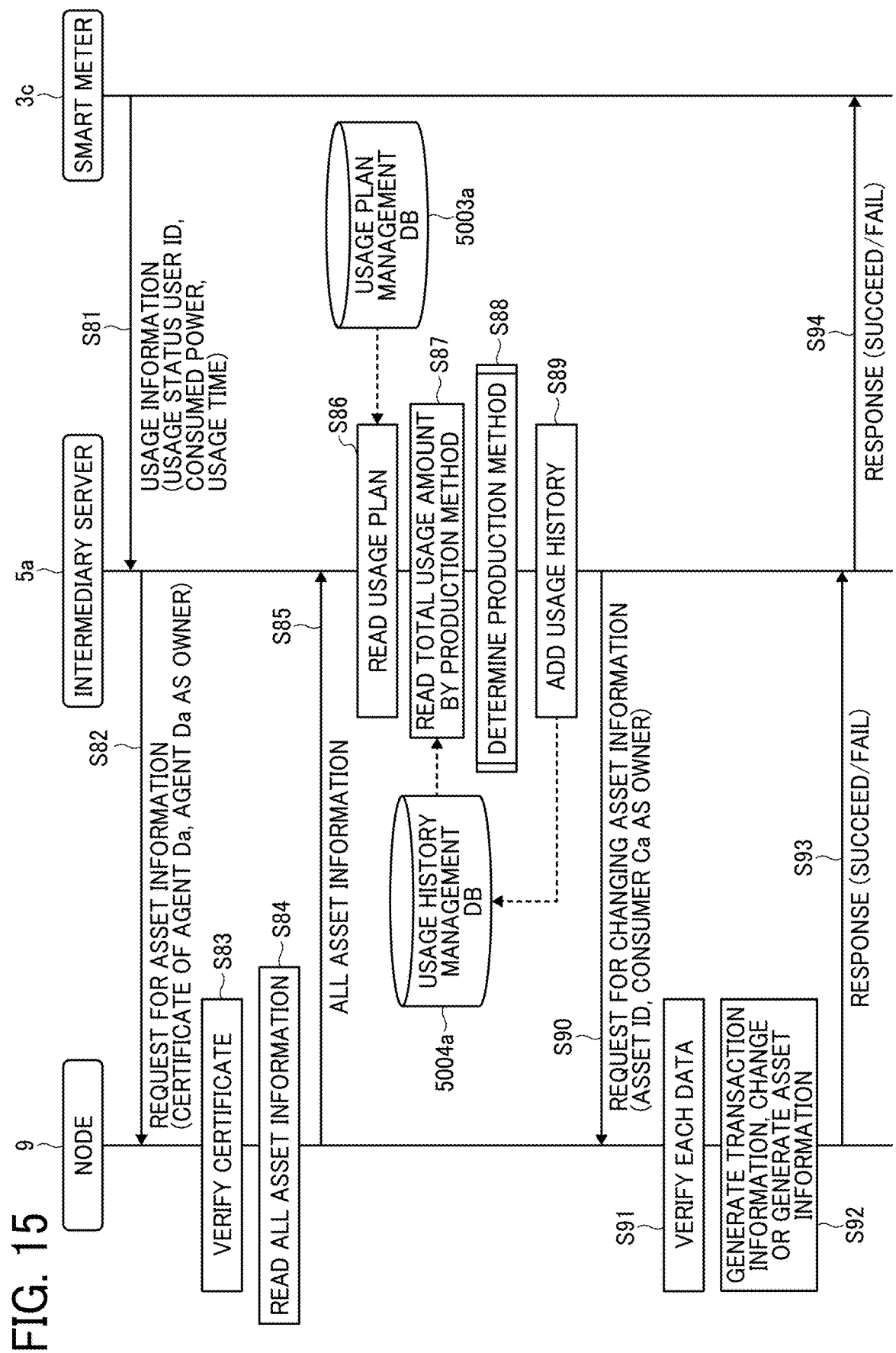
FIG. 15 is a sequence diagram illustrating processing of setting the user as an owner of the asset, according to the exemplary embodiment.
Figure 19:
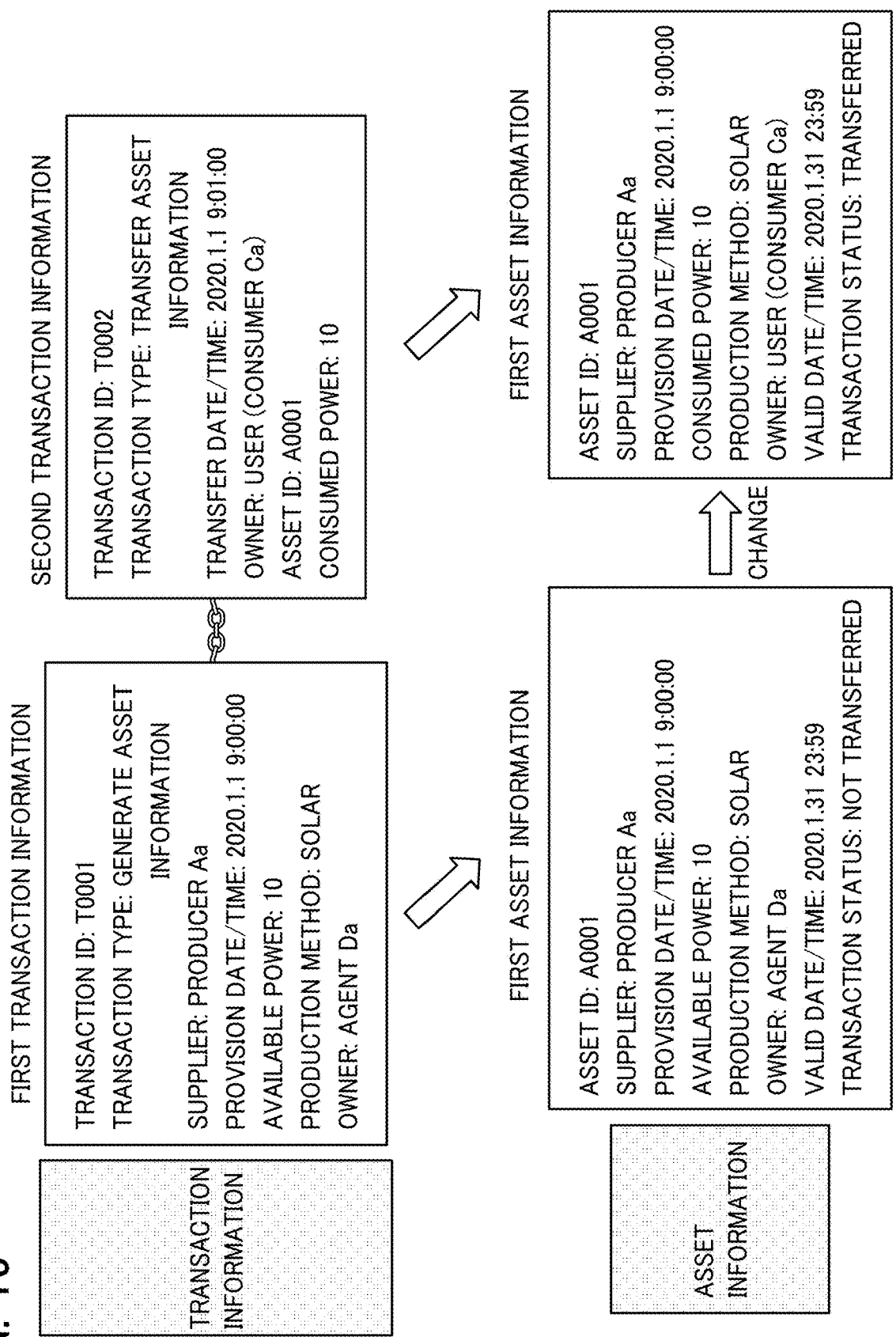
FIG. 19 is a conceptual diagram illustrating transition of transaction information and asset information in the process of transferring ownership between an intermediary agent and a user, according to the exemplary embodiment.

Processing of Providing Asset Information from the Intermediary Agent to the User:

Referring now to FIGS. 15 and 19, processing of setting the user as an owner of the asset, which is owned by the intermediary agent after processing of FIG. 13, is described, according to the embodiment. FIG. 15 is a sequence diagram illustrating processing of setting the user as an owner of the asset, according to the embodiment.

First, the transmission and reception unit 31c of the smart meter 3c of the consumer Ca transmits usage information on usage of electricity, as asset, every predetermined time (for example, every 30 minutes) via the communication network 100 (S81). This usage information includes various information on electricity as asset, such as a usage status of electricity, a user ID for identifying the consumer Ca as the user, the amount of electricity being used, and a time during when electricity is used. The transmission and reception unit 51a of the intermediary server 5a receives the usage information. The transmission and reception unit 51a transmits a request for all asset information in which the intermediary agent Da of the intermediary server 5a is set as an owner, to the node 9 of the blockchain network 90 (S82). This request includes an electronic certificate certifying that the intermediary agent Da is a legitimate registered intermediary agent, and information indicating the intermediary agent Da as an owner, so that the intermediary server 5a of the intermediary agent Da can access the blockchain network 90. Accordingly, the transmission and reception unit 91 of the node 9 receives the request for all asset information.

Next, the verification unit 93 of the node 9 verifies the certificate received at S82 (S83). The certificate verification is a process of determining whether or not the received certificate is a certificate of the server (in this example, the intermediary server 5a) that is registered in advance in the node 9. The following describes the example case in which the verification result indicates that verification is successful.

The storing and reading unit 99 of the node 9 reads out all items of asset information regarding assets indicating that the intermediary agent Da of the intermediary server 5a as the owner (S84). The transmission and reception unit 91 transmits all items of asset information read at S84 to the intermediary server 5a (S85). The transmission and reception unit 51a of the intermediary server 5a receives all the asset information. Accordingly, the intermediary server 5a receives all asset information with ownership that is currently assigned to the intermediary agent Da and can be allocated to the user. Next, the storing and reading unit 59a of the intermediary server 5a searches the usage plan management DB 5003a using the user ID received at S81 as a search key to read out usage plan information corresponding to the user ID (S86). Further, the storing and reading unit 59a searches the usage history management DB 5004a using the user ID received at S81 as a search key to read out total amount of asset having been used by each production method corresponding to the user ID (S87). For example, from the usage history management DB 5004a of FIG. 8B, the storing and reading unit 59 reads 20 (kWh) as total amount of electricity produced from solar light, and 160 (kWh) as total amount of electricity produced from oil, of all electricity consumed by the user.

Next, the asset determination unit 53a determines a type of production method of asset, so as to determine particular asset information to be transferred to the consumer Ca as the user, based on the usage plan information read at S86 and total usage amount of asset by each production method that is read at S87 (S88).

Figure 16:
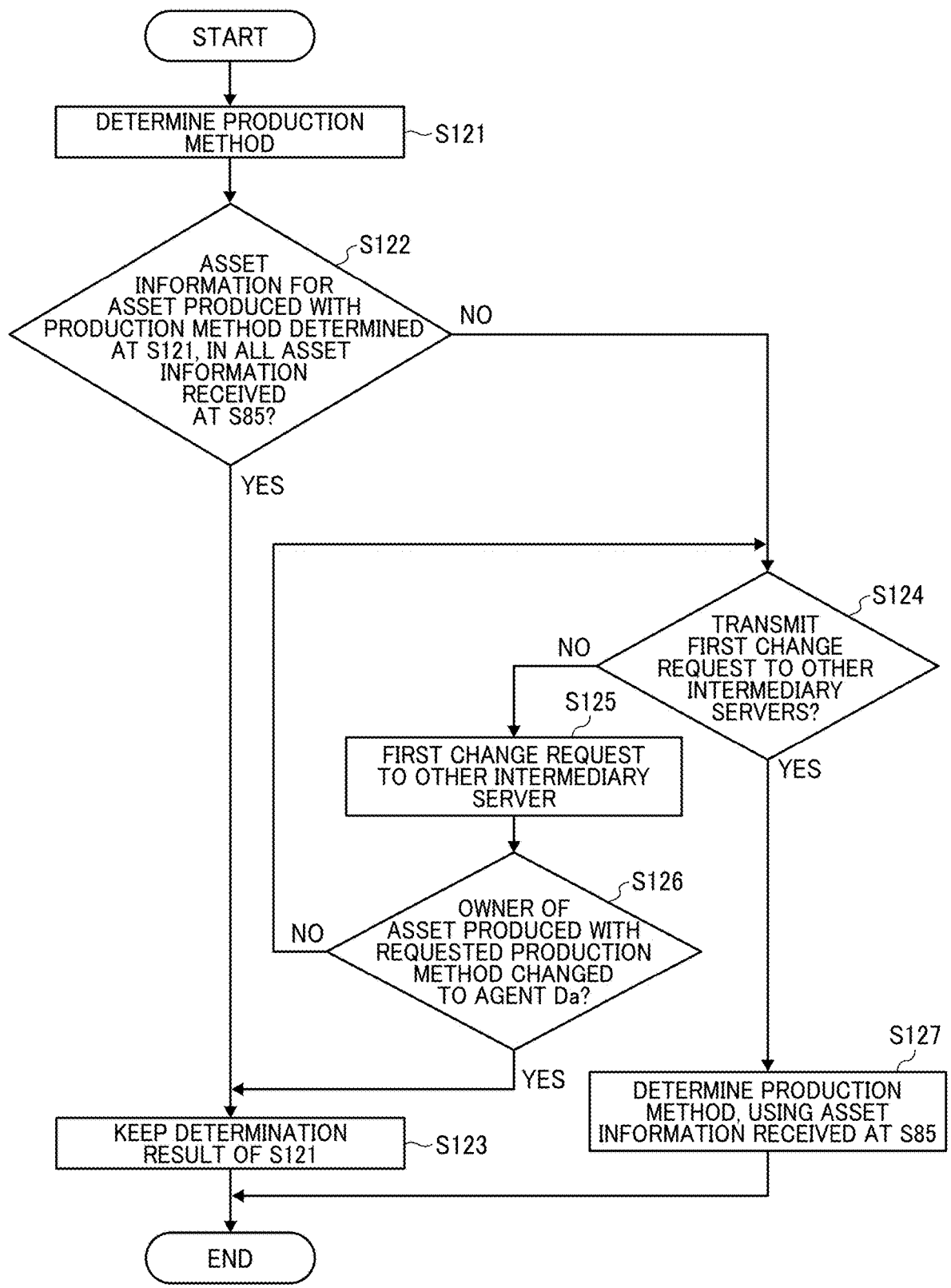
FIG. 16 is a flowchart illustrating processing of determining a production method, according to the exemplary embodiment.
Figure 17:
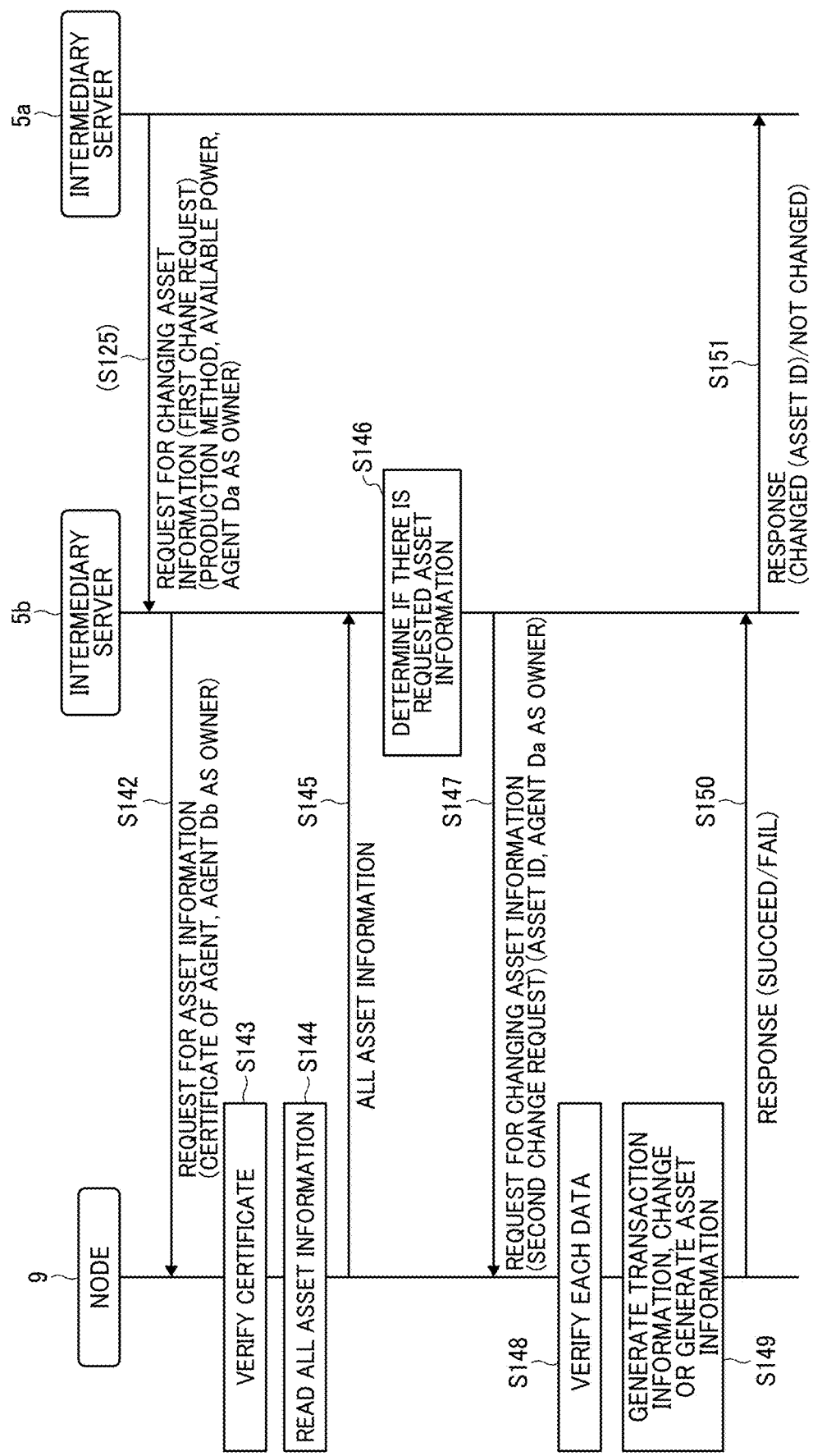
FIG. 17 is a sequence diagram illustrating processing of transferring ownership of an asset produced by a specific type of production method between different intermediary agents, according to the exemplary embodiment.

Processing to Determine Production Method:

The processing of determining a production method at S88 is described in detail with reference to FIGS. 16 to 18. FIG. 16 is a flowchart illustrating processing of determining a production method, according to the exemplary embodiment. FIG. 17 is a sequence diagram illustrating processing of transferring ownership of an asset produced by a specific type of production method between different intermediary servers, according to the exemplary embodiment.

As illustrated in FIG. 16, the asset determination unit 53a determines a type of production method of asset (electricity), so as to determine particular asset information to be transferred to the consumer Ca as the user, based on the usage plan information read at S86 and total usage amount of asset by each production method that is read at S87 (S121). For example, when the usage plan information indicates that two types of production method "solar light" and "oil" are set for the consumer Ca, and the renewable energy usage ratio of 40% is set, since the usage history information indicates that the total usage amount is 20 kWh for solar and 160 kWh for oil (that is, the renewable energy usage ratio is less than 40%), the asset determination unit 53a determines the production method to be "solar light" so as to achieve the renewable energy usage ratio of 40%. Accordingly, the asset determination unit 53a selects, from among all asset information received at S85, asset information having the production method of solar light, to be transferred to the customer Ca.

Next, the determination unit 55a determines whether specific asset information, which satisfies the following conditions, is included in the asset information received at S85 (S122). The conditions include: (1) the transaction status is set as "not transferred"; (2) the production method set is the production method determined at S121; and (3) the available amount is equal to the usage amount received at S81. When the determination unit 55a determines that the particular asset information is included (S122: YES), the asset determination unit 53a keeps the determination result obtained at S121 (S123). The detailed processing of S88 illustrated in FIG. 16 then ends.

When the determination unit 55a determines at S122 that the specific asset information is not included (S122: NO), the operation proceeds to S124. At S124, the determination unit 55a determines whether a request (first change request) for changing ownership of asset information from an intermediary agent of other intermediary server to the intermediary agent Da of the intermediary server 5a, has been transmitted to all intermediary servers other than the intermediary server 5a that are available. At S124, when the determination unit 55a determines that the first change request has not been transmitted to all the intermediary servers other than the intermediary server 5a (NO), as illustrated in FIG. 17, the transmission and reception unit 51a of the intermediary server 5a transmits the first change request to the intermediary server 5b as an example of the other server other than the intermediary server 5a (S125).

Here, the determination unit 55*a* determines that the owner of the specific asset, indicated by the specific asset information, produced by the above-described production method is not to be changed from the original owner. Specifically, the transmission and reception unit 51*a* transmits a request (an example of the first change request) for changing ownership of a particular asset from the intermediary agent db of the intermediary server 5*b* to the intermediary agent Da of the intermediary server 5*a*. The particular asset is an asset having produced by a specific type of production method that is determined at S121. This request includes information indicating the type of production method determined at S121, an available amount based on the planned usage amount read at S86, and the owner (intermediary agent Da) of the asset to be transferred. The owner (intermediary agent Da) may be identified by a name of the owner or an owner ID of the owner, as long as the owner (intermediary agent Da) can be identified. Accordingly, the transmission and reception unit 51*b* of the intermediary server 5*b* receives the request for changing the ownership (first change request).

The transmission and reception unit 51*b* of the intermediary server 5*b* transmits a request for all asset information in which the intermediary agent db of the intermediary server 5*b* is set as an owner, to the node 9 of the blockchain network 90 (S142). This request includes an electronic certificate certifying that the intermediary agent db is a legitimate registered intermediary agent, and information indicating the intermediary agent db as an owner, so that the intermediary server 5*b* of the intermediary agent db can access the blockchain network 90. Accordingly, the transmission and reception unit 91 of the node 9 receives the request for all asset information.

Next, the verification unit 93 of the node 9 verifies the certificate received at S142 (S143). The certificate verification is a process of determining whether or not the received certificate is a certificate of the server (in this example, the intermediary server 5*b*) that is registered in advance in the node 9. The following describes the example case in which the verification result indicates that verification is successful.

The storing and reading unit 99 of the node 9 reads out all items of asset information regarding assets indicating that the intermediary agent db of the intermediary server 5*b* as the owner (S144). The transmission and reception unit 91 transmits all items of asset information read at S144 to the intermediary server 5*b* (S145). The transmission and reception unit 51*b* of the intermediary server 5*b* receives all the asset information.

Next, the determination unit 55*b* of the intermediary server 5*b* determines whether specific asset information, which satisfies the following conditions, is included in the asset information received at S145 (S146). The conditions include: (1) the transaction status is set to "not transferred"; (2) the production method set is the production method determined at S125; and (3) the available amount is equal to the usage amount received at S125. For example, when the asset information of electricity, which is set with the production method of solar light, is requested at S125, the determination unit 55*b* of the intermediary server 5*b* determines whether there is any asset information set with the production method of "solar light". Of a plurality of items of asset information received at S145, if there is only asset information indicating available amount that is less than available amount that is requested at S125, the determination unit 55*b* determines whether a sum of available amounts indicated by more than one asset information satisfies the available amount requested at S125. The following describes the example case in which there is one item of specific asset information set with the production method that is requested.

Next, the transmission and reception unit 51*b* of the intermediary server 5*b* transmits a request (an example of second change request) for changing ownership of specific asset information determined at S146, from the intermediary agent db of the intermediary server 5*b* to the intermediary agent Da of the intermediary server 5*a*, to the node 9 of the blockchain network 90 (S147). This change request transmitted at S147 includes an asset ID for identifying specific asset information that is determined at S146. The change request transmitted at S147 also includes information on a new owner (intermediary agent Da).

Next, at the node 9, the verification unit 93 verifies each item of information (asset ID, owner) received at S147 (S148). This verification processing is for determining whether or not each item of information has a predetermined content that is written in a predetermined format. The following describes the example case in which the verification result indicates that verification is successful.

Next, the node 9 generates transaction information and changes (or generates) asset information, according to the change request received at S147 (S149).

Here, the process of generating transaction information at S149 will be described in detail with reference to FIG. 18. FIG. 18 is a conceptual diagram illustrating transition of transaction information and asset information in the process of S149, according to the exemplary embodiment. In FIG. 19, it is assumed that the first transaction information and the first asset information have already been generated. Further, the first asset information, which indicates that the owner is the intermediary db and the production method is solar light, is managed on the blockchain network 90.

Figure 18:
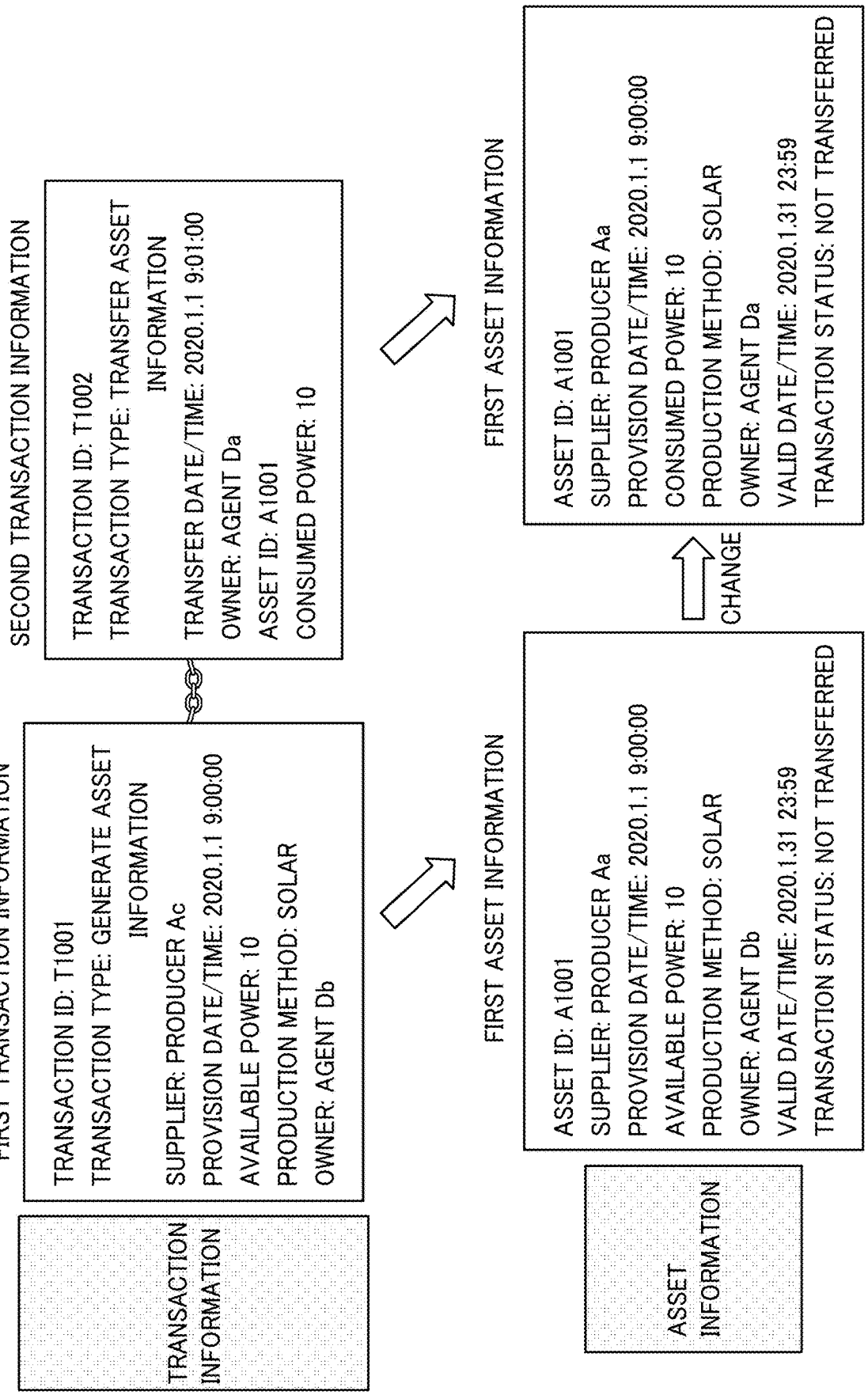
FIG. 18 is a conceptual diagram illustrating transition of transaction information and asset information in the process of transferring ownership between intermediary agents, according to the exemplary embodiment.

As illustrated in FIG. 18, the transaction processing unit 96 generates second transaction information, and adds a block containing the second transaction information to the chain of blocks containing the first transaction information, which is stored in the storage unit 9000. Still referring to FIG. 18, the asset processing unit 97 changes contents of the first asset information according to the second transaction information. The second transaction information includes a unique transaction ID and a transaction type indicating transfer of asset information. The second transaction information additionally includes the transfer date and time when transfer of asset information is intermediated, a new owner (such as intermediary agent Da) of asset as a result of transfer, an asset ID for identifying the asset information that is transferred, and an available amount of asset (in this example, electricity).

Then, the asset processing unit 97 changes the first asset information as illustrated in FIG. 18. The asset processing unit 97 changes the owner from the "intermediary agent db" to the "intermediary agent Da" in the first asset information. Since the asset information has not been transferred to an end user such as the consumer Ca, and the asset information can be further transferred to other entity, the transaction status remains "not transferred" in the first asset information.

Subsequently, referring back to FIG. 17, the transmission and reception unit 91 of the node 9 transmits a response to the request received at S147 to the intermediary server 5*b* (S150). This response indicates that processing performed in response to the request received at S147 succeeded or failed. The transmission and reception unit 51*b* of the intermediary server 5*b* receives the response.

Next, the transmission and reception unit 51b of the intermediary server 5b transmits a response to the request received at S125 to the intermediary server 5a (S151). When the transmission and reception unit 51b receives a response indicating "success" at S150, the transmission and reception unit 51b transmits an asset ID for identifying the asset information that has been changed, and information indicating the change is completed, to the intermediary server 5a, as the response to be transmitted to the response at S151. When the transmission and reception unit 51b receives a response indicating "failure" at S150, the transmission and reception unit 51b transmits information indicating that change cannot be made, to the intermediary server 5a, as the response to be transmitted to the response at S151. Accordingly, the transmission and reception unit 51a of the intermediary server 5a receives the response from the intermediary server 5b. In a case in which determination at S146 indicates that no asset information requested by the intermediary server 5a exists, the transmission and reception unit 51b transmits information indicating that change cannot be made at S151.

Returning to FIG. 16, the determination unit 55a determines whether ownership of the asset produced by the specific production method requested at S125, has been changed from an owner other than the intermediary agent Da to the intermediary agent Da of the intermediary server 5a, as a response transmitted at S151 to the request received at S125 (S126). At S126, when it is determined that ownership has been changed to indicate transfer of asset (YES), the operation proceeds to S123. At S123, the asset information transferred from the other intermediary server db is assigned to the intermediary server Da.

On the other hand, when it is determined that ownership has not been changed such that transfer of asset is not made at S126 (NO), the operation returns to S124.

Further, when the determination unit 55a determines that the first change request has been transmitted to all the intermediary servers that can be inquired other than the own server at S124 (YES), the asset determination unit 53a determines other specific production method, from among different production methods indicated by the asset information received at S85 (S127). In this example case, the asset information of the asset (electricity) produced using solar light is not transferred from the intermediary server 5b to the intermediary server 5a. Through this processing, the intermediary server 5a transfers ownership of the asset information of the asset (electricity) produced using such as oil. Since tracking of transfer of ownership can be performed every 30 minutes, ownership of the asset information of the asset (electricity) producing using solar light may be transferred from such as the intermediary server 5b to the intermediary server 5a, after 30 minutes. The detailed processing of S88 illustrated in FIG. 16 then ends.

Referring back to FIG. 15, the storing and reading unit 59a stores information on usage of asset produced by the production method determined at S88, that is, usage of electricity produced from solar light as indicated by the asset information determined at S88, in the usage history management DB 5004a (S89). Specifically, for example, the storing and reading unit 59a adds, to the usage history management DB 5004 (see FIG. 8B), a record having the usage date and time of "2020.1.1 9:00-9:30", the usage amount of 10 kWh, the production method of solar light, and the total usage amount of electricity produced from solar light of 30 kWh.

Next, the transmission and reception unit 51a of the intermediary server 5a transmits a request (an example of third change request) for changing the asset information to the node 9 of the blockchain network 90 (S90). This change request includes an asset ID for identifying the asset information indicating the asset produced from the production method that is determined at S88, from among the asset information received at S85. The change request transmitted at S90 also includes information on a new owner (consumer Ca). The information indicating the new owner may be the user ID received at S81 or the name of the user as the new owner. When there are a plurality of items of asset information on the asset produced using the specific type of production method determined at S88, the transmission and reception unit 51a determines a request for changing particular asset information, related to the asset having a valid date closet to the current date, from among the plurality of items of asset information.

Next, at the node 9, the verification unit 93 verifies each item of information (asset ID, owner) received at S90 (S91). This verification processing is for determining whether or not each item of information has a predetermined content that is written in a predetermined format. The following describes the example case in which the verification result indicates that verification is successful.

Next, the node 9 generates transaction information and changes (or generates) asset information, according to the change request received at S90 (S92).

The processing of generating transaction information at S92 is described in detail with reference to FIG. 19. FIG. 19 is a conceptual diagram illustrating transition of transaction information and asset information in the process of generating transaction information and generating or changing asset information at S92, according to the exemplary embodiment. The first transaction information and the first asset information illustrated on the left side of FIG. 18 are the same as the transaction information and the asset information of FIG. 14, respectively. The following describes an example case in which, after the smart meter 3a sets the owner of the asset to the intermediary agent Da (the first asset information is generated based on the first transaction information), the intermediary server 5 changes the owner of the asset to the consumer Ca (the first asset information is changed based on the second transaction information), as the intermediary agent Da intermediates transfer of the asset information (ownership of asset).

At S92, the transaction processing unit 96 generates the second transaction information as illustrated in FIG. 19. The second transaction information includes a unique transaction ID and a transaction type indicating transfer of asset information. The second transaction information additionally includes the transfer date and time when transfer of asset information is intermediated, a new owner of asset as a result of transfer, an asset ID for identifying the asset information that is transferred, and a consumed amount of asset (in this example, electricity) received at S90.

Then, at S105, the asset processing unit 97 changes the first asset information as illustrated in FIG. 19. The asset processing unit 97 changes the "available amount (power)" in the first asset information to the "consumed amount (power)" in the second asset information, and changes the owner from the "intermediary agent Da" in the first asset information to the "consumer Ca" in the second asset information. The asset processing unit 97 changes the transaction status from "not transferred" to "transferred" in the first asset information. The asset information whose transaction status has been changed to "transferred" through this processing will be excluded from a target of transfer in the future. Therefore, the transaction processing unit 96 does not refer to the asset information having the transaction status of "transferred", as asset information subjected to processing the transaction information having the transaction type of "transfer asset information". That is, the asset information excluded from the target of transfer is not re-transferred.

The processing of S92 thus ends.

Subsequently, returning to FIG. 15, the transmission and reception unit 91 of the node 9 transmits a response to the request received at S90 to the intermediary server 5 (S93). This response indicates that processing performed in response to the request received at S90 succeeded or failed. The transmission and reception unit 51 of the intermediary server 5 receives the response.

Next, the transmission and reception unit 51a of the intermediary server 5a transmits a response to the information received at S81 to the smart meter 3c (S94). Accordingly, the transmission and reception unit 31c of the smart meter 3c receives the response from the intermediary server 5a. This response includes contents of response (success or failure) received at S93, and is stored for management or displayed by the smart meter 3c. Further, when the intermediary server 5a receives a response from the intermediary server 5b indicating that "change is completed" at S151, the transmission and reception unit 51a transmits a response indicating "success" to the smart meter 3c at S94.

Facilitating Procedure for Obtaining Production Method Certificate:

Next, referring to FIG. 20, processing of facilitating procedure for obtaining a production method certificate is described according to the embodiment. FIG. 20 is a sequence diagram illustrating processing of facilitating procedure for obtaining a production method certificate of asset, according to the embodiment. The consumer Ca transmits a request for obtaining a production method certificate from the certification authority E, to the intermediary agent Da. The production method certificate certifies that electricity consumed by the consumer Ca has been produced from renewable energy, such as a solar light. The following describes this processing in detail.

As illustrated in FIG. 20, according to operation of the consumer Ca on the smartphone 2c, the transmission and reception unit 21c transmits a request for obtaining a production method certificate of asset via the communication network 100 (S201). Accordingly, the transmission and reception unit 51a of the intermediary server 5a receives the request for obtaining a production method certificate. This request includes a user ID for identifying the consumer Ca as the user, and information on a usage time period during when asset is being used. For example, the consumer Ca requests for a production method certificate of asset, for a usage time period from Jan. 1, 2020 to Jan. 31, 2020.

Next, the transmission and reception unit 51a of the intermediary server 5a transmits a request for transaction information and asset information to the node 9 of the blockchain network 90 (S202). This request includes information on a certificate of the user (here, consumer Ca) that the intermediary server 5 previously acquires from the smartphone 2c (certificate of the intermediary server 5), information indicating the user as the owner (here, consumer Ca), and a usage time period. Accordingly, the transmission and reception unit 91 of the node 9 receives the request. The certificate of the intermediary server 5a has the same contents as that of the certificate transmitted from the intermediary server 5a to the node 9 at S82. Further, the usage time period information has the same contents as that of the usage time period information received at S201.

Next, the verification unit 93 of the node 9 verifies the certificate received at S202 (S203). The certificate verification is a process of determining whether or not the received certificate is a certificate of the server (in this example, the intermediary server 5a) that is registered in advance in the node 9. The following describes the example case in which the verification result indicates that verification is successful.

Next, the storing and reading unit 99 reads out the transaction information and the asset information in which the consumer Ca is set as the owner, within a predetermined usage time period indicated by the usage time period information received at S202 (S204). In this case, the storing and reading unit 99 reads out particular transaction information having the usage date and time that falls within the predetermined usage time period and the new owner of the consumer Ca. Further, the storing and reading unit 99 reads the asset information having the asset ID, which is indicated by the particular transaction information that is read.

Then, the transmission and reception unit 91 of the node 9 transmits the requested transaction information and asset information to the intermediary server 5a (S205). Accordingly, the transmission and reception unit 51a of the intermediary server 5a receives the transaction information and the asset information.

Next, at the intermediary server 5a, the creation unit 58a creates an application form to be submitted by the intermediary agent Da to the certification authority E, based on the transaction information and the asset information. This application form is used to apply for a production method certificate to prove the type of production method for the asset.

Subsequently, as illustrated in FIG. 1, the intermediary agent Da sends the application form created at S206 to the certification authority E by mail or the like (S1). Then, the certification authority E creates a production method certificate of asset, which certifies that 40% of electricity consumed by the consumer Ca has been produced from renewable energy such as solar light, and sends the production method certificate by mail or the like to the intermediary agent (S2). Then, the intermediary agent Da sends the production method certificate to the consumer Ca by mail or the like (S3). If necessary, the certification authority E may acquire transaction information and asset information from the blockchain network 90 and confirm the contents before issuing the production method certificate.

The processing of facilitating procedure for obtaining the production method certificate by the intermediary agent Da then ends. The consumer Ca is able to use the production method certificate to enhance public image of the company or apply the government for a subsidy based on use of renewable energy.

As described above, according to the above-described embodiment, when the intermediary server 5a does not have ownership of the asset produced by a specific production method (S122: NO), it is determined that the owner of the asset produced by the specific production method requested by the smart meter 3c cannot be changed. In such case, for example, the asset can be transferred from the intermediary server 5b to the intermediary server 5a (S126: YES). This prevents increase in price of asset, and facilitates effective use of asset.

For some assets such as electricity, even though qualities of assets provided to the user are kept constant, it has been difficult to prove how the asset is produced. In view of this, according to the above-described embodiments, the node 9 of the blockchain network 90 generates asset information indicating a type of production method of asset and ownership of asset, and transaction information from which such asset information is generated. Through managing these asset information and transaction information, a production method of asset can be verified, and a production method certificate can be issued based on this verification.

Moreover, in order to encourage stable consumption of electricity, it is necessary to adjust the consumed electricity and the produced electricity in real time to make them equal. Since the blockchain is a decentralized ledger system, it takes a certain amount of time to confirm consistency of each ledger information via the network. Therefore, it is not suitable to apply the blockchain technology to track use of such asset, which requires responsiveness in realtime, as in the case of electricity use. In view of this, in the present embodiment, the intermediary server 5 is configured to transmit a request for changing the ownership of the asset information on the blockchain network 90 from the original owner to the user (consumer Ca), not at a time when the consumer Ca starts using the asset (electricity), but after the consumer Ca has consumed the asset (electricity) (S89). Through this processing, which allows processing like deferred payment, the blockchain technology can be applied to exchange of asset, or transfer of ownership of asset, requiring real-time processing. While the above-described embodiment uses electricity as such asset requiring real-time processing, any other type of energy, is applicable as secondary energy such as hydrogen. Moreover, since the intermediary server 5 changes the asset information managed by the blockchain network 90 on behalf of the supplier (producer Aa, etc.) and the user (consumer Ca, etc.), the supplier (producer Aa, etc.) and the user (consumers Ca, etc.) can exchange electricity, without any need to consider whether the asset information has been changed.

Further, the intermediary server 5 is able to transfer the ownership of particular asset produced with a specific production method, such that exchange of electricity produced from renewable energy such as solar light can be effectively tracked.

Furthermore, in an example case in which one intermediary agent is not able to provide sufficient amount of electricity, the intermediary server automatically sends a request to one or more other intermediary servers, to ask for transfer of ownership of electricity. Through this processing, energy can be effectively used in the system.

In any one of the above-described embodiments, the asset information includes information on the owner of the asset, however, the asset information may not include such information on the owner. For example, when the user is consuming electricity produced by the user, such that the user is the producer of the asset, there is no need to transfer the asset to another entity (another person or another company), as long as a type of production method can be verified.

Further, in any one of the above-described embodiments, electricity is used as an example of asset, which is an item having value. Examples of asset include any other tangible asset that physically exists, and any other non-tangible asset that does not physically exist.

Examples of tangible asset include, but are not limited to, foods such as grains, vegetables, fruits, meats, marine products or processed foods. For example, by tracking asset information including additional information on how the food is produced, determination of whether the food confirms some standards (for example, organic labeling standards) can be made. When the assets are grains, vegetables and fruits, the asset information includes information indicating whether or not pesticides have been used, or information indicating a producer or a place of production. When the asset is meat, the asset information includes information indicating whether or not the animal is bred using a genetically modified crop, or information indicating a producer or a place of production. When the asset is a marine product such as fish or shellfish, the asset information includes information indicating a natural product or aquaculture, or information indicating a producer (fisherman) or a production area (fishing area). When the asset is a processed product, the asset information includes information indicating an allergen, information indicating whether or not the product has been processed using a genetically modified crop, or information indicating a location of a processor or a processing plant.

Examples of non-tangible asset include, but are not limited to, real estate such as land and buildings, and movable property such as goods or quantity of goods. When the asset is real estate, the asset information includes information such as ownership of the asset. When the asset is movable property, the asset information includes information such as ownership of the asset.

On the other hand, examples of non-tangible asset include, but are not limited to, tokens (virtual currency) or quantity of tokens, carbon dioxide emission credits, intellectual property rights, and contracts. When the asset is a token, the asset information includes information on such as ownership of the asset. When the asset is a carbon dioxide emission credit, the asset information includes information on such as ownership of the asset. When the asset is a right such as an intellectual property right, the asset information includes information on such as the owner of the right, the transferee of the right, and the licensee. When the asset is a contract, the asset information includes information on such as contract conditions and contract performance. In addition or in alternative to contracts, treaties, agreements, promises, and memorandums (memos) may be treated as asset.

Further, other types of asset that can be managed in a substantially similar manner as the example case of electricity, to allow postpaid processing, include gas (other form of energy), water, and communication. In the case of gas, water, or communication, the asset information includes information such as ownership of the asset.

Each of the above-described hardware components, like CPU 201, 301, 501, and 901, may be a single device or a plurality of devices.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

Further, the power generator 4a (4b) may be additionally provided with a smart meter 3a (3b), or has a function of the smart meter 3a (3b). Alternatively or additionally, the electric device 8 may be provided with the smart meter 3c, or has a function of the smart meter 3c.

Further, any of the above-described programs may be stored in a recording medium such as a DVD for distribution.

Further, communication of data between the smartphone 2 (or the smart meter 3), intermediary server 5, and the node 9 may be performed via any other server.

Furthermore, any one of the intermediary server 5*a* and 5*b* may be provided with at least one node 9, or at least a part of functions provided by the node 9.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

In one exemplary embodiment, the present invention resides in a non-transitory computer-readable medium encoded with computer-readable instructions that, when executed by a processor, cause the processor to perform a method of tracking exchange of energy. The method includes: receiving, from other intermediary server, a first request for changing ownership of energy having been produced by a particular production method, from an intermediary agent of the intermediary server to other intermediary agent of the other intermediary server; in response to reception of the first request, transmitting, to a decentralized ledger system that manages energy information on energy, a second request for changing ownership of energy from the intermediary agent to the other intermediary agent; and in response to reception of a notification indicating that the ownership of energy is changed to the other intermediary agent from the decentralized ledger system, transmitting to the other intermediary server a response indicating that the ownership of energy is changed to the other intermediary agent.

In one example, an intermediary server for intermediating transfer of an asset between a supplier of the asset and a user of the asset, by requesting a change of an owner of the asset to a blockchain network, is provided. The intermediary server includes: transmission means configured to transmit a first change request to another intermediary server capable of requesting a change of an owner of a particular asset to the blockchain network, when the intermediary server is not able to change the owner of the particular asset produced by a particular type of production method from the previous owner to the user. The first change request requests to change the owner of an asset produced by a same production method type as the particular production method type, from another intermediary agent managing the other intermediary server, to an intermediary agent managing the intermediary server.

In one example, the intermediary server further includes reception means that receives a response indicating completion of the change transmitted from the other intermediary server. when the other intermediary server transmits a second change request in response to the first change request transmitted by the transmission means, the second change request requesting the blockchain network to change the owner of the same production method type from the other intermediary agent to the intermediary agent, and the change according to the second change request is completed. The transmission means further transmits a third change request to the blockchain network, the third change request requesting to change the owner of the asset of the same production method type for which the change is completed according to the second change request, from the intermediary agent to the user.

In one example, at the intermediary server, the reception means receives all asset information that indicates a production method type of the asset and further indicates the owner of the asset being the intermediary agent, from the blockchain network. When the particular asset information indicating the particular asset produced by the particular type of production method is not included in all the asset information received by the reception means, the transmission means determines that the owner of the particular asset produced by the particular type of production method cannot be changed from the previous owner to the user, and transmits the first change request to the other intermediary server.

In one example, the intermediary server further includes: transaction history management means configured to manage a transaction history of assets produced by the particular type of production method. In this disclosure, the transaction history management means corresponds to a usage history management table. The intermediary server further includes determination means that determines a particular type of production method of asset for the asset information having the owner to be changed from the other intermediary agent to the intermediary agent, based on the transaction history managed by the transaction history management means and a usage ratio of a predetermined type of production method. When the particular asset information indicating the particular asset produced by the particular type of production method, determined by the determination means, is not included in all the asset information received by the reception means, the transmission means determines that the owner of the particular asset produced by the particular type of production method cannot be changed from the previous owner to the user, and transmits the first change request to the other intermediary server.

In one example, the asset is electricity.

In one example, the type of production method is one of a production method using renewable energy, a production method using fossil fuels, and a production method using nuclear power.

In one example, the renewable energy is one of solar light, solar heat, wind power, biomass, geothermal heat, hydroelectric power, and heat in the atmosphere.

In one example, an intermediary system includes any one of the above-described intermediary server, and the other intermediary server.

In one example, a method for requesting is performed by an intermediary server that intermediates transfer of an asset between a supplier of the asset and a user of the asset, by requesting a change of an owner of the asset to a blockchain network. The method includes: transmitting a first change request to another intermediary server capable of requesting a change of an owner of a particular asset to the blockchain network, when the intermediary server is not able to change the owner of the particular asset produced by a particular type of production method from the previous owner to the user. The first change request requests to change the owner of an asset produced by a same production method type as the particular production method type, from another intermediary agent managing the other intermediary server, to an intermediary agent managing the intermediary server.

In one example, a program for causing a computer to carry out the above-described method is provided.

In one example, a computer-readable recording medium storing a program that causes a computer to carry out the above-described method is provided.

The invention claimed is:

1. A first intermediary server for intermediating ownership of electricity between a first intermediary agent for managing a first intermediary server and a second intermediary agent for managing a second intermediary server, the first intermediary server comprising:
   a memory; and
   circuitry, connected to the memory, configured to perform:
      receiving usage information including a usage amount of electricity which is an asset being used by a consumer, transmitted from a smart meter of the consumer, every predetermined time;
      transmitting, to a node of a blockchain, a request for all items of asset information regarding assets indicating that the first intermediary agent as the owner, which are managed with the blockchain;
      receiving, from the node, all items of asset information regarding assets indicating that the first intermediary agent as the owner;
      reading a total usage amount of the electricity used by the consumer, by each of a plurality of production methods of electricity;
      determining a particular production method of the plurality of production methods based on a renewable energy usage ratio of electricity to be transferred to the consumer, and based on the total usage amount of the electricity, wherein the renewable energy usage ratio is a ratio of electricity produced from renewable energy used by the consumer to a total amount of electricity used by the consumer;
      determining there is no specific asset information from among all items of asset information indicating the first intermediary agent as the owner, wherein the specific asset information has a transaction status of not transferred, the particular production method that is determined, and the usage amount;
      transmitting, to the second intermediary server, a first request for changing the owner of asset information, the first request including the particular production method, an available amount based on the usage amount, and the first intermediary agent as a new owner of electricity to be transferred to the consumer; and
      receiving a confirmation from the node that the ownership has been transferred.

2. The first intermediary server of claim 1, wherein the circuitry is further configured to perform:
   receiving, from the second intermediary server, a response indicating completion of the change of ownership from the second intermediary server to the first intermediary server, based on completion of the change of ownership; and
   transmitting a request to the node requesting to change ownership of electricity produced by the particular production method for which the change of ownership is completed from the first intermediary agent to the consumer.

3. The first intermediary server of claim 2, wherein the asset information indicates, as the production method of the electricity, one of production of electricity using a renewable source, production of electricity using fossil fuels, and production of electricity using nuclear power.

4. The first intermediary server of claim 3, wherein when the production method of the electricity is production of electricity using a renewable source, the asset information indicates that the renewable source is one of solar light, solar heat, wind power, biomass, geothermal power, hydropower, heat in the atmosphere, or a combination thereof.

5. The first intermediary server of claim 1, wherein the node of the blockchain is one or more of a plurality of computers.

6. A system comprising:
   the first intermediary server of claim 1; and
   the second intermediary server comprising another circuitry configured to perform:
   transmitting a second request requesting the node to change ownership of electricity produced by the particular production method from the second intermediary agent to the first intermediary agent, in response to receiving the first request.

7. A method for intermediating ownership of electricity between a first intermediary agent for managing a first intermediary server and a second intermediary agent for managing a second intermediary server, the method comprising:
   receiving usage information including a usage amount of electricity which is an asset being used by a consumer, transmitted from a smart meter of the consumer, every predetermined time;
   transmitting, to a node of a blockchain, a request for all items of asset information regarding assets indicating that the first intermediary agent as the owner, which are managed with the blockchain;
   receiving, from the node, all items of asset information regarding assets indicating that the first intermediary agent as the owner;
   reading a total usage amount of the electricity used by the consumer, by each of a plurality of production methods of electricity;
   determining a particular production method of the plurality of production methods based on a renewable energy usage ratio of electricity to be transferred to the consumer, and based on the total usage amount of the electricity, wherein the renewable energy usage ratio is a ratio of electricity produced from renewable energy used by the consumer to a total amount of electricity used by the consumer;
   determining there is no specific asset information from among all items of asset information indicating the first intermediary agent as the owner, wherein the specific asset information has a transaction status of not transferred, the particular production method that is determined, and having the usage amount;
      transmitting, to the second intermediary server, a first request for changing the owner of asset information, the first request including the particular production method that is determined, an available amount based on the usage amount, and the first intermediary agent as a new owner of electricity to be transferred to the consumer; and
      receiving a confirmation from the node that the ownership has been transferred.

8. The method of claim 7, further comprising:
   receiving, from the second intermediary server, a response indicating completion of the change of ownership from the second intermediary server to the first intermediary server, based on completion of the change of ownership; and transmitting a request to the node requesting to change ownership of electricity produced by the particular production method for which the change of ownership is completed from the first intermediary agent to the consumer.

9. The method of claim 8, wherein the asset information indicates, as the production method of the electricity, one of production of electricity using a renewable source, production of electricity using fossil fuels, and production of electricity using nuclear power.

10. The method of claim 9, wherein when the production method of the electricity is production of electricity using a renewable source, the asset information indicates that the renewable source is one of solar light, solar heat, wind power, biomass, geothermal power, hydropower, heat in the atmosphere, or a combination thereof.

11. The method of claim 7, wherein the node of the blockchain is one or more of a plurality of computers.

12. A non-transitory computer readable medium storing a program, which when executed by one or more processors, causes a method for intermediating ownership of electricity between a first intermediary agent for managing a first intermediary server and a second intermediary agent for managing a second intermediary server to be performed, the method comprising:

receiving usage information including a usage amount of electricity which is an asset being used by a consumer, transmitted from a smart meter of the consumer, every predetermined time;

transmitting, to a node of a blockchain, a request for all items of asset information regarding assets indicating that the first intermediary agent as the owner, which are managed with the blockchain;

receiving, from the node, all items of asset information regarding assets indicating that the first intermediary agent as the owner;

reading a total usage amount of the electricity used by the consumer, by each of a plurality of production methods of electricity;

determining a particular production method of the plurality of production methods based on a renewable energy usage ratio of electricity to be transferred to the consumer, and based on the total usage amount of the electricity, wherein the renewable energy usage ratio is a ratio of electricity produced from renewable energy used by the consumer to a total amount of electricity used by the consumer;

determining there is no specific asset information from among all items of asset information indicating the first intermediary agent as the owner, wherein the specific asset information has a transaction status of not transferred, having the particular production method that is determined, and the usage amount;

transmitting, to the second intermediary server, a first request for changing the owner of asset information, the first request including the particular production method that is determined, an available amount based on the usage amount, and the first intermediary agent as a new owner of electricity to be transferred to the consumer; and receiving a confirmation from the node that the ownership has been transferred.

13. The non-transitory computer readable of claim 12, wherein the method further comprises:

receiving, from the second intermediary server, a response indicating completion of the change of ownership from the second intermediary server to the first intermediary server, based on completion of the change of ownership; and transmitting a request to the node requesting to change ownership of electricity produced by the particular production method for which the change of ownership is completed from the first intermediary agent to the consumer.

14. The non-transitory computer readable of claim 13, wherein the asset information indicates, as the production method of the electricity, one of production of energy using a renewable source, production of electricity using fossil fuels, and production of electricity using nuclear power.

15. The non-transitory computer readable of claim 14, wherein when the production method of the electricity is production of electricity using a renewable source, the asset information indicates that the renewable source is one of solar light, solar heat, wind power, biomass, geothermal power, hydropower, heat in the atmosphere, or a combination thereof.

16. The non-transitory computer readable of claim 15, wherein the node of the blockchain is one or more of a plurality of computers.

* * * * *